United States Patent
Seki

(10) Patent No.: US 9,604,296 B2
(45) Date of Patent: Mar. 28, 2017

(54) WORKING MACHINE

(71) Applicant: MAKITA CORPORATION, Aichi (JP)

(72) Inventor: Yoshio Seki, Tokyo (JP)

(73) Assignee: MAKITA CORPORATION, Aichi (JP)

( * ) Notice: Subject to any disclaimer, the term of this patent is extended or adjusted under 35 U.S.C. 154(b) by 226 days.

(21) Appl. No.: 14/635,410

(22) Filed: Mar. 2, 2015

(65) Prior Publication Data

US 2015/0283631 A1 Oct. 8, 2015

(30) Foreign Application Priority Data

Apr. 4, 2014 (JP) ................... 2014-078160

(51) Int. Cl.
*F02D 11/02* (2006.01)
*F02D 11/04* (2006.01)
*B23D 57/02* (2006.01)
*B27B 17/08* (2006.01)

(52) U.S. Cl.
CPC .......... *B23D 57/023* (2013.01); *B27B 17/083* (2013.01); *F02D 11/02* (2013.01); *F02D 11/04* (2013.01)

(58) Field of Classification Search
CPC ....... B23D 57/023; B23D 57/02; F02D 11/02; F02D 11/04; A01G 3/08; A01G 3/085; A01G 3/086; B27B 17/083; F02P 5/02
See application file for complete search history.

(56) References Cited

U.S. PATENT DOCUMENTS

2003/0075132 A1* 4/2003 Ohsawa .................. F02D 11/02
123/179.18

FOREIGN PATENT DOCUMENTS

JP          3713455          11/2005

* cited by examiner

*Primary Examiner* — Jacob Amick
(74) *Attorney, Agent, or Firm* — Greenblum & Bernstein, P.L.C.

(57) ABSTRACT

A chainsaw as a working machine, which switches among stop, drive, and choke operations of an internal combustion engine, includes an operation lever that is turnable, a turning member turnably combined with the operation lever, and a torsion coil spring holding abutting of the operation lever and the turning member. The turning member is coupled to a choke operating member via a choke rod and is regulated in turning from drive position to stop position. When the operation lever is turned from drive position to choke position, the turning member also turns to move the choke rod, by which the choke operating member closes the choke valve. Meanwhile, the operation lever is turned from drive position to stop position, against the turning force of the torsion coil spring.

11 Claims, 21 Drawing Sheets

WORKING MACHINE

CROSS-REFERENCE TO RELATED APPLICATION

The application claims priority to Japanese Patent Application No. 2014-78160 filed on Apr. 4, 2014, the entire contents of which are incorporated herein by reference.

BACKGROUND OF THE INVENTION

1. Field of the Invention

The present invention relates to a working machine that performs switching among stop, drive, and choke operations of an internal combustion engine provided as a power source (motor).

2. Description of Related Art

As this type of working machine, there has been known a working machine disclosed in Japanese Patent No. 3713455, for example. The working machine disclosed in Japanese Patent No. 3713455 includes: a rotating member that is rotatable to a first rotational position in which an internal combustion engine provided as a power source is stopped, a second rotational position in which the internal combustion engine is made ready to start, and a third rotational position in which a choke opening and closing mechanism is activated; and a rod-shaped transmission member with the distal end coupled to the choke opening and closing mechanism and the proximal end attached to an escape hole formed in the rotating member. While the rotating member rotates from the first rotational position to the second rotational position in this working machine, only the proximal end of the transmission member moves inside the escape hole, and the entire transmission member does not move. On the other hand, while the rotating member rotates from the second rotational position to the third rotational position, the movement of the proximal end of the transmission member inside the escape hole is regulated and the transmission member moves in the longitudinal direction, thereby activating the choke opening and closing mechanism so as to close a choke valve.

In such a configuration that the movement of the proximal end of the transmission member inside the escape hole is allowed as in the above-described conventional technique, the proximal end of the transmission member may be caught in the escape hole or violently move inside the escape hole. Therefore, the choke operation through the transmission member might be unreliable or unstable. Moreover, there is still room for improvement in the conventional configuration in light of the durability of the rotating member and the transmission member.

SUMMARY OF THE INVENTION

Therefore, it is an object of the present invention to provide a working machine that performs switching among stop, drive, and choke operations of an internal combustion engine provided as a power source to enable reliable and stable choke operation with a relatively simple configuration and to reduce a decrease in durability of the components.

According to an aspect of the present invention, there is provided a working machine having an internal combustion engine provided as a power source and performing switching among stop, drive, and choke operations of the internal combustion engine. The working machine includes: an operation lever turnable to a stop position in which the internal combustion engine is stopped, a drive position (start position) in which the internal combustion engine is made to be operatonal, and a choke position in which the choke operation is performed; a turning member turnably combined with the operation lever; a coupling biasing member that couples the operation lever to the turning member and imparts relative turning forces to both the operation lever and the turning member; and a choke rod with one end coupled to a choke operating member that operates a choke valve and the other end coupled to the turning member. The operation lever and the turning member are held in a state abutting each other due to the turning forces imparted by the coupling biasing member, and the turning member is regulated in turning in a direction from the drive position to the stop position. When the operation lever is turned from the drive position to the choke position, the turning member turns along with the operation lever to move the choke rod, and the movement of the choke rod causes the choke operating member to close the choke valve, whereas when the operation lever is turned from the drive position to the stop position, the operation lever moves against the turning force imparted by the coupling biasing member without turning the turning member.

Other objects and features of aspects of the present invention will be understood from the following description with reference to the accompanying drawings.

DESCRIPTION OF PREFERRED EMBODIMENTS

Hereinafter, embodiments of the present invention will be described with reference to accompanying drawings.

Figure 1:
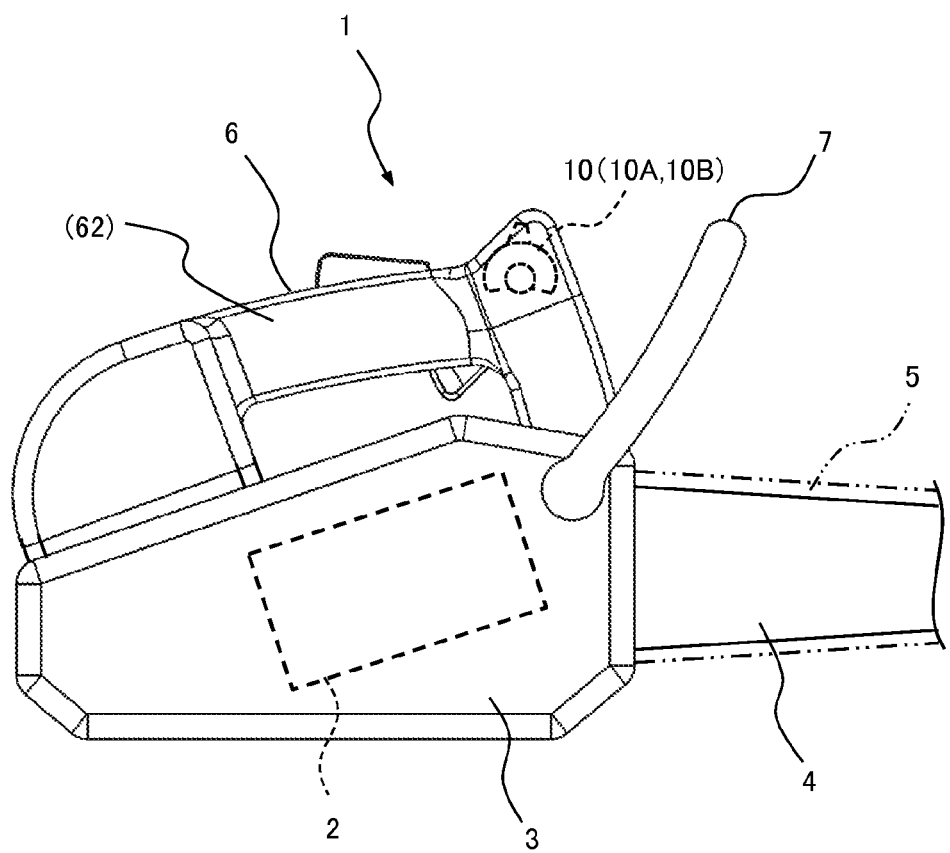
FIG. 1 is a right side view of a chainsaw, which is an example of a working machine to which the present invention is applied.

FIG. 1 is a right side view of a chainsaw, which is an example of a working machine to which the present invention is applied. As illustrated in FIG. 1, a chainsaw 1 according to this embodiment includes a main body 3 that accommodates an internal combustion engine (engine) 2 as a power source (motor), a guide bar 4 extending forward from the main body 3, a saw chain 5 wound around the guide bar 4, a top handle 6 extending in the front-back direction in the upper side of the main body 3, and a brake lever 7 provided in front of the top handle 6. The chainsaw 1 also has a substantially laterally-facing U-shaped side handle (not illustrated in FIG. 1) extending from the left side surface of the top handle 6 to the left side surface of the main body 3.

In general, an operator grips the top handle 6 with the right hand and the side handle with the left hand, and pushes the guide bar 4 and the saw chain 5 into an object to be cut, such as wood, to cut the object to be cut. In addition, an operating unit 10 (10A, 10B) is provided in the top handle 6, and the chainsaw 1 is configured so that the internal combustion engine 2 can be switched between the stop, drive, and choke operations according to an operator's operation of the operating unit 10 (10A, 10B).

First Embodiment

Figure 2:
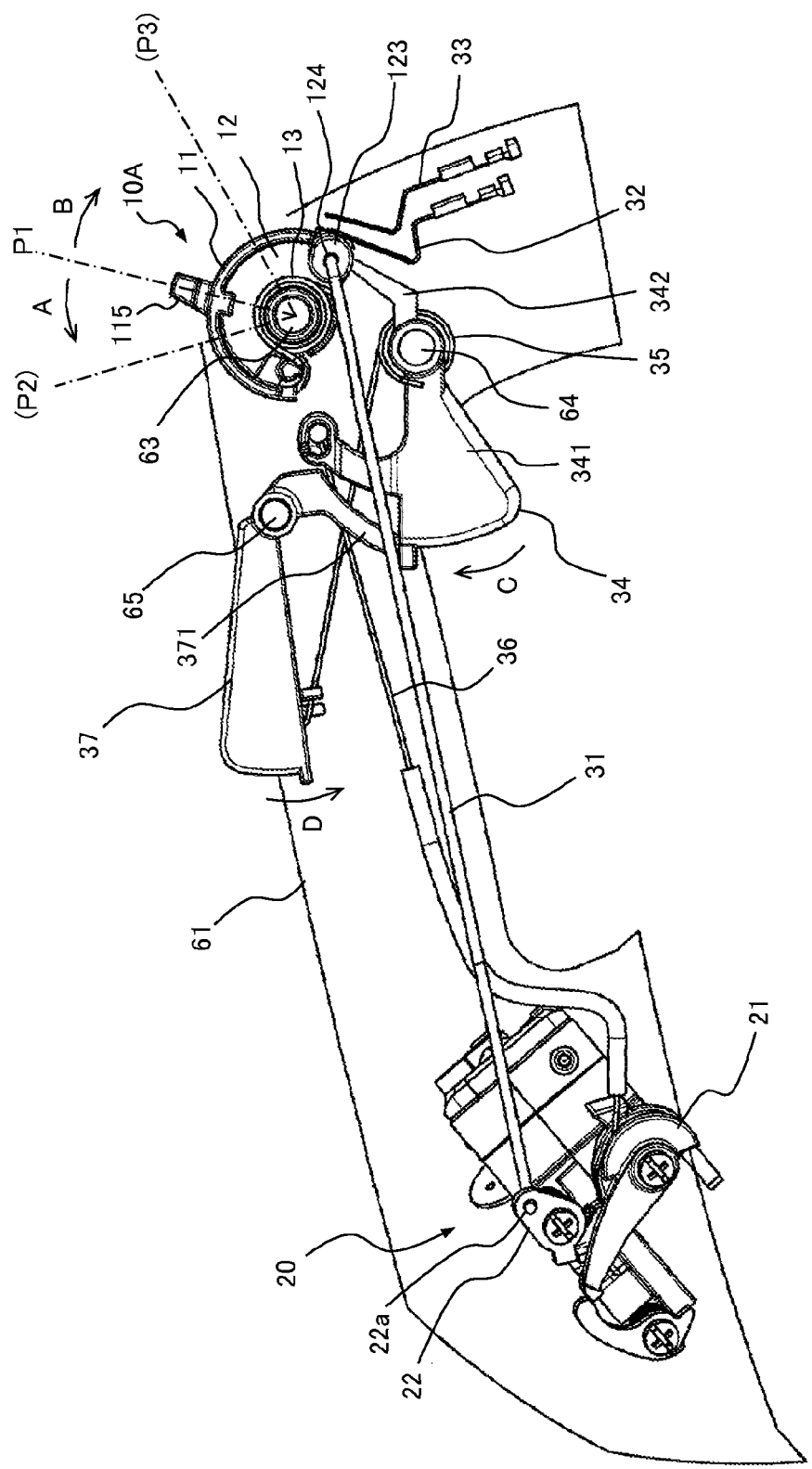
FIG. 2 is an enlarged view illustrating the internal structure of a top handle of the chainsaw in a first embodiment.

FIG. 2 is an enlarged view illustrating the internal structure of the top handle 6 in a first embodiment.

In this embodiment, the top handle 6 is formed by joining a left casing 61 to a right casing 62 (see FIG. 1) opposing the left casing, so as to be formed in a hollow shape. Furthermore, the operating unit 10A is arranged inside the top handle 6 on the front end side thereof, and a carburetor 20 is arranged inside the top handle 6 on the rear end side thereof.

The carburetor 20 is a device for supplying the internal combustion engine 2 with an air-fuel mixture. The carburetor 20 has a throttle valve and a choke valve (not illustrated). The throttle valve mainly adjusts the flow rate of the air-fuel mixture supplied to (taken into) the internal combustion engine 2. The throttle valve is configured to be biased in a direction of closing the throttle valve with a return spring or the like (not illustrated) and to be opened by a throttle operating member 21 provided to the carburetor 20. The choke valve is mainly operated in order to temporarily increase (thicken) the air fuel ratio of the air-fuel mixture mainly supplied to (taken into) the internal combustion engine 2. The choke valve is configured to be biased in a direction of opening the choke valve by a return spring or the like (not illustrated) and to be closed by a choke operating member 22 provided to the carburetor 20.

The carburetor 20 incorporates a start-assist mechanism (not illustrated) which interlocks the choke valve with the throttle valve. The start-assist mechanism is configured to slightly open (for example, half open) the throttle valve when the choke valve is closed. The interlocking between the choke valve and the throttle valve by the start-assist mechanism is released by opening the throttle valve during the interlocking.

Next, the operating unit 10A will be described.

In this embodiment, the operating unit 10A has an operation lever 11, a turning member 12, a torsion coil spring (coupling biasing member) 13, all of which are integrated and attached to a first support shaft 63 erected on the inner surface of the top handle 6 (the left casing 61 in this embodiment).

The operation lever 11 is turnably supported by the first support shaft 63. The turning member 12 is turnably combiners with the operation lever 11, more specifically, the turning member 12 is combined with the operation lever 11 in a manner capable of turning around the first support shaft 63. The torsion coil spring 13 couples the operation lever 11 with the turning member 12, and imparts relative turning forces (biasing forces) to both of the operation lever 11 and the turning member 12.

The operation lever 11 and the turning member 12 are held in a state of abutting each other by the turning forces imparted by the torsion coil spring 13. Normally, the operation lever 11 and the turning member 12 turn in a unified manner. More specifically, the turning of the operation lever 11 causes the turning member 12 to turn accordingly. On the other hand, it is also possible to cause only the operation lever 11 to turn without the turning of the turning member 12, for example, by imparting an external force (turning operation force) resisting against the turning force, which is imparted to the operation lever 11 by the torsion coil spring 13, to the operation lever 11 in a state in which the turning of the turning member 12 is regulated. In this case, the abutment between the operation lever 11 and the turning member 12 is released. When the external force (the turning operation force) is removed, the operation lever 11 and the turning member 12 again abut each other due to the turning force.

Hereinafter, the configuration of the operating unit 10A will be described more specifically with reference to FIGS. 3 to 5.

Figure 3:
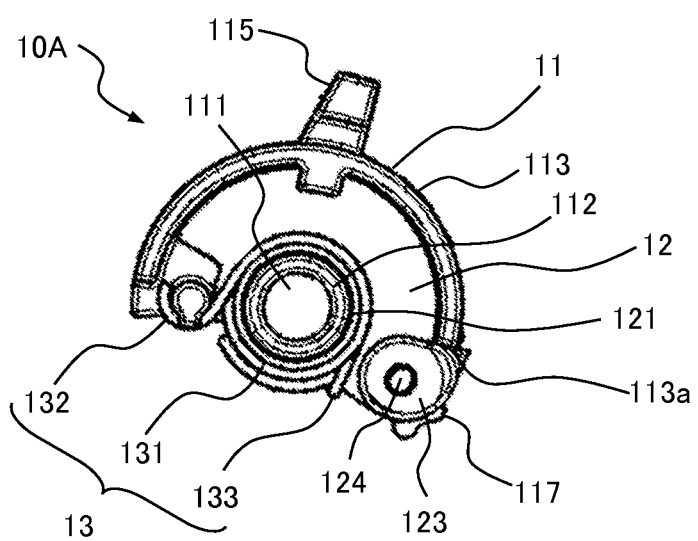
FIG. 3 is an assembly diagram (enlarged view) of an operating unit of the chainsaw in the first embodiment.
Figure 4:
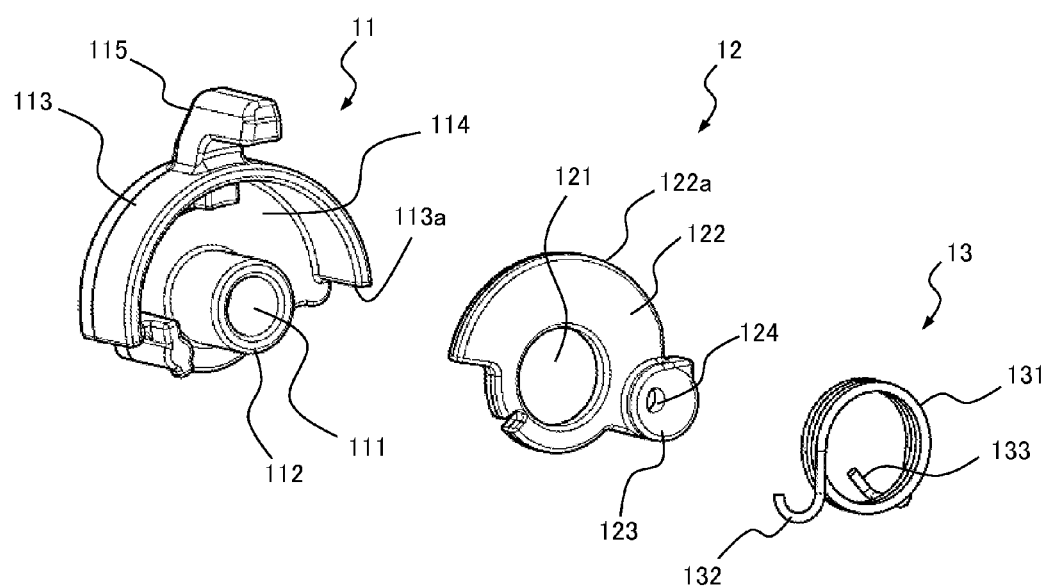
FIG. 4 is an exploded perspective view (enlarged view) of the operating unit in the first embodiment.
Figure 5:
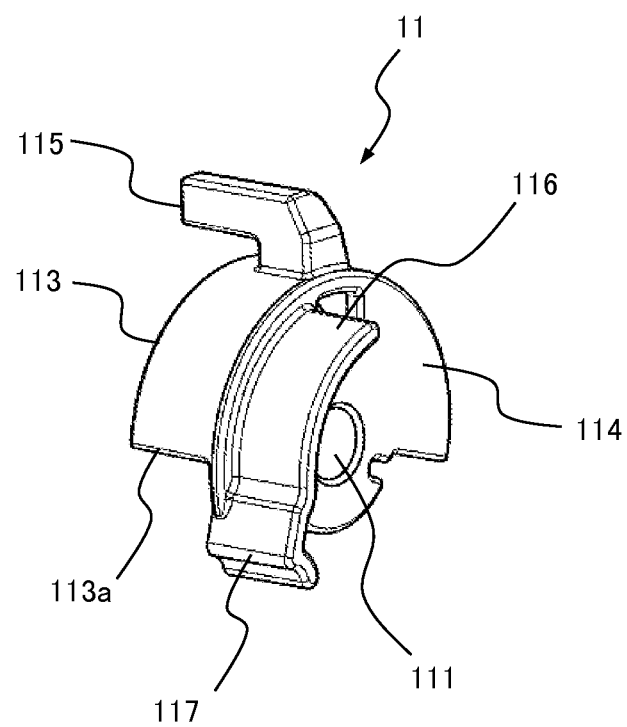
FIG. 5 is a diagram of an operation lever, which constitutes the operating unit, viewed from the opposite side to those of FIGS. 3 and 4.

FIGS. 3 to 5 are enlarged views each illustrating the configuration of the operating unit 10A. FIG. 3 is an overall view (assembly diagram) of the operating unit 10A and FIG. 4 is an exploded perspective view of the operating unit 10A. FIG. 5 is a diagram of the operation lever 11, which constitutes the operating unit 10A, viewed from the opposite side to that of FIG. 4.

The operation lever 11 is formed of synthetic resin, for example. The operation lever 11 has a cylindrical shaft portion 112 with a shaft insertion hole 111 through which the first support shaft 63 can be inserted, a peripheral wall 113 arranged outward in a radial direction of the cylindrical shaft portion 112, and a coupling portion 114 that couples the cylindrical shaft portion 112 to the peripheral wall 113 on one end side in the axial direction of the cylindrical shaft portion 112.

The peripheral wall 113 is formed in an approximately semi-arcuate shape in such a way as to be concentric with the cylindrical shaft portion 112 and an operating projection 115 is projected in the vicinity of the central portion of the outer surface of the peripheral wall 113. Moreover, as illustrated in FIG. 5, there is provided a stepped face portion 116 formed to be one stage lower than the outer surface of the peripheral wall 113 on the back side of the coupling portion 114 (i.e., on the surface opposite to the surface on the peripheral wall 113 side) in the operation lever 11. A projection portion 117 protruding in an angle shape is formed on the stepped face portion 116. Therefore, the projection portion 117 projects outward in the radial direction of the shaft insertion hole 111 (the first support shaft 63) and is located in the vicinity of the lower part of one end portion (an end portion on the right side of FIG. 3) 113a (the lower part is located in a direction of extending the one end portion) in the circumferential direction of the peripheral wall 113 on the back side of the coupling portion 114.

The turning member 12 is formed of, for example, synthetic resin similarly to the operation lever 11. The turning member 12 has a substantially flat plate-like flat plate portion 122 with a through hole 121 through which the cylindrical shaft portion 112 of the operation lever 11 can be inserted, and a boss portion 123 erected in the vicinity of an edge of one surface of the flat plate portion 122 (see FIG. 4).

The flat plate portion 122 is formed so as to have an arcuate outer edge 122a having a smaller diameter than the peripheral wall 113 of the operation lever 11. A part of the boss portion 123 overhangs outward from the arcuate outer edge 122a. On the top face of the boss portion 123, there is formed a rod insertion hole 124 into which one end of a choke rod 31, described later, is inserted.

The torsion coil spring 13 has a coil portion 131 through which the cylindrical shaft portion 112 of the operation lever 11 can be inserted (specifically, having an inner diameter greater than the outer diameter of the cylindrical shaft portion 112), a first hook portion 132 that is pulled out (extends) from one end side of the coil portion 131 and hooked on the operation lever 11, and a second hook portion 133 that is pulled out (extends) from the other end side of the coil portion 131 and hooked on the turning member 12.

The operation lever 11, the turning member 12, and the torsion coil spring 13 are integrated as described below to constitute the operating unit 10A.

First, the turning member 12 is mounted on the cylindrical shaft portion 112 of the operation lever 11 via the through hole 121 formed in the flat plate portion 122. To do this, the arcuate outer edge 122a of the flat plate portion 122 of the turning member 12 is arranged inside the peripheral wall 113 of the operation lever 11, and the boss portion 123 of the turning member 12 is arranged in the lower part of the one end portion 113a of the peripheral wall 113 of the operation lever 11. Thereby, the turning member 12 is combined with the operation lever 11 in a manner capable of turning around the cylindrical shaft portion 112 (and thus, around the first support shaft 63).

Next, the coil portion 131 of the torsion coil spring 13 is attached to the cylindrical shaft portion 112 of the operation lever 11 exposed (projecting) from the through hole 121 of the turning member 12. Additionally, the first hook portion 132 of the torsion coil spring 13 is hooked on the operation lever 11, and the second hook portion 133 of the torsion coil spring 13 is hooked on the turning member 12. This integrates the operation lever 11, the turning member 12, and the torsion coil spring 13. Specifically, the torsion coil spring 13 couples the operation lever 11 to the turning member 12, and the torsion coil spring 13 imparts relative turning forces to both of the operation lever 11 and the turning member 12. Furthermore, the operation lever 11 and the turning member 12 are held in a state of abutting each other, more specifically in a state in which the one end portion 113a of the peripheral wall 113 of the operation lever 11 abuts the outer peripheral surface of the boss portion 123 of the turning member 12 from above, by a turning force imparted by the torsion coil spring 13 (see FIG. 3).

In this manner, the operating unit 10A, which is integrally constituted by the operation lever 11, the turning member 12, and the torsion coil spring 13, is attached to the first support shaft 63 via the shaft insertion hole 111 of the cylindrical shaft portion 112 of the operation lever 11. Specifically, the operating unit 10A is attached to the first support shaft 63 with the operating projection 115 of the operation lever 11 positioned on the upper side and the torsion coil spring 13 positioned on the front side. Thereafter, the turning member 12 is coupled to the choke operating member 22 of the carburetor 20 via the rod-shaped choke rod 31 extending in the front-back direction inside the top handle 6, thereby completing the attachment of the operating unit 10A to the top handle 6. The operating unit 10A in this state is illustrated in FIG. 2. As illustrated in FIG. 2, according to this embodiment, one end of the choke rod 31 is bent substantially at a right angle and inserted into a rod insertion hole 124 formed in the boss portion 123 of the turning member 12, and the other end is bent substantially at a right angle and inserted into a coupling hole 22a formed in the choke operating member 22, so that the choke rod 31 couples the turning member 12 to the choke operating member 22.

As illustrated in FIG. 2, when the operating unit 10A is mounted on the top handle 6, the operating projection 115 of the operation lever 11 is exposed upward from the opening portion (not illustrated) formed on the upper surface of the top handle 6. The operating projection 115 is normally pushed or pulled in the front-back direction with the thumb of the operator's right hand griping the top handle 6. This causes the operation lever 11 to turn in the direction of arrow A or arrow B around the first support shaft 63. Specifically, the operation lever 11 is configured to be able to turn to the drive position P1 illustrated in FIG. 2, to a stop position P2 where the operation lever 11 is turned by a given amount in the direction of the arrow A from the drive position P1, to a choke position P3 where the operation lever 11 is turned by a given amount in the direction of the arrow B from the drive position P1. Note here that the drive position P1 is a position at which the internal combustion engine 2 is able to be operated, the stop position P2 is a position at which the internal combustion engine 2 is stopped, and the choke position P3 is a position at which the choke valve of the carburetor 20 is activated (is closed).

Inside the top handle 6, there are provided a pair of plate-shaped terminals (a primary-side plate-shaped terminal 32 and a ground-side plate-shaped terminal 33) for disabling an ignition section (not illustrated) of the internal combustion engine 2 in the front lower part of the first support shaft 63 (and the operating unit 10A attached thereto). The primary-side plate-shaped terminal 32 and the ground-side plate-shaped terminal 33 are formed of elastic material and are arranged at a given space from each other with one end supported. The primary-side plate-shaped terminal 32 is connected to the primary side of the ignition coil of the ignition section via wiring (not illustrated) and the ground-side plate-shaped terminal 33 is connected to ground via wiring (not illustrated).

The free end of the primary-side plate-shaped terminal 32 is formed as a curved portion curved in an arcuate shape, for example, so as to be convex to the rear (specifically, toward the operating unit 10A) and is abutted the stepped face portion 116 of the operation lever 11 of the operating unit 10A mounted on the top handle 6. In a state in which the free end (curved portion) of the primary-side plate-shaped terminal 32 abuts a portion other than the projection portion 117 of the stepped face portion 116 of the operation lever 11, the primary-side plate-shaped terminal 32 and the ground-side plate-shaped terminal 33 are separated from each other as illustrated in FIG. 2. When the primary-side plate-shaped terminal 32 and the ground-side plate-shaped terminal 33 are separated from each other, the ignition section is enabled. In other words, the ignition section can be activated and the internal combustion engine 2 is in an operable state. On the other hand, when the primary-side plate-shaped terminal 32 comes in contact with the ground-side plate-shaped terminal 33, the primary side of the ignition coil is short-circuited to ground and the ignition section is disabled. In other words, the ignition section is not activated and the internal combustion engine 2 is stopped.

The top handle 6 is provided with a throttle lever 34.

The throttle lever 34 has a substantially-sectorial lever main body 341 and is turnably supported by a second support shaft 64 erected on the rear lower side of the first support shaft 63 on the inner surface of the top handle 6 (left casing 61). The throttle lever 34 is biased to a position (initial position) in which most of the lever main body 341 is exposed downward from the opening portion (not illustrated) formed on the lower surface of the top handle 6 by a torsion coil spring 35 attached to the second support shaft 64 (see FIG. 2). Then, the throttle lever 34 is normally turned with the forefinger of the operator's right hand which holds the top handle 6. More specifically, the throttle lever 34 is pulled using the forefinger of the operator's right hand griping the top handle 6, thereby turning in the direction of arrow C from the initial position.

The throttle lever 34 is coupled to the throttle operating member 21 of the carburetor 20 via the throttle wire 36. More specifically, one end of the throttle wire 36 is attached to the throttle lever 34 and the other end is attached to the throttle operating member 21. When the throttle lever 34 is turned, the turning motion is transmitted to the throttle operating member 21 via the throttle wire 36, by which the throttle operating member 21 opens the throttle valve.

The throttle lever 34 has a turning inhibiting section 342 that prevents the turning of the operation lever 11. When the throttle lever 34 is placed in the initial position, the turning inhibiting section 342 abuts the outer peripheral surface of the boss portion 123 of the turning member 12 from obliquely below to prevent the turning of the operation lever 11 in the direction of the arrow B, more specifically, the turning from the drive position P1 to the choke position P3.

As described above, the operation lever 11 is held in a state in which one end portion 113a of the peripheral wall 113 of the operation lever 11 abuts the outer peripheral surface of the boss portion 123 of the turning member 12 from above (see FIG. 3). Therefore, the turning inhibiting section 342 of the throttle lever 34 abuts the outer peripheral surface of the boss portion 123 of the turning member 12 from below, thereby preventing the turning of the operation lever 11 in the direction of the arrow B. On the other hand, when the throttle lever 34 is turned from the initial position, the abutment of the turning inhibiting section 342 on the outer peripheral surface of the boss portion 123 of the turning member 12 is released, thereby enabling the operation lever 11 to turn in the direction of the arrow B (allowing the turning operation).

Note that, however, free turning of the throttle lever 34 is regulated by a lock lever 37 in order to prevent a throttle operation or the like unintended by the operator, in this embodiment. In other words, the throttle lever 34 is configured to be able to turn only when the lock lever 37 is operated.

The lock lever 37 is turnably supported by a third support shaft 65 erected on the upper rear side of the second support shaft 64 inside the top handle 6 (left casing 61). The lock lever 37 is biased to a position (initial position) where a part of the lock lever 37 is exposed upward from the opening portion (not illustrated) formed in the upper surface of the top handle 6 by a torsion coil spring 35 attached to the second support shaft 64. In other words, in this embodiment, the torsion coil spring 35 attached to the second support shaft 64 has one end hooked on the throttle lever 34 and the other end hooked on the lock lever 37, thereby biasing the throttle lever 34 and the lock lever 37 to the respective initial positions thereof. Then, normally the exposed portion of the lock lever 37 is pushed in by the operator's right hand which grips the top handle 6, in other words, the lock lever 37 is gripped together with the top handle 6, by which the lock lever 37 turns in the direction of arrow D from the initial position.

The lock lever 37 has a turning inhibiting section 371 that inhibits the turning of the throttle lever 34. In this embodiment, the turning inhibiting section 371 extends downward toward the lever main body 341 of the throttle lever 34 to prevent further turning of the throttle lever 34 by abutting the throttle lever 34 which has slightly turned when the lock lever 37 is placed in the initial position. On the other hand, when the exposed portion is pushed in by the operator and the lock lever 37 turns from the initial position in the direction of the arrow D, the turning inhibiting section 371 moves to a retreat position where the turning inhibiting section 371 does not abut the throttle lever 34, thereby enabling the turning operation of the throttle lever 34.

Figure 6:
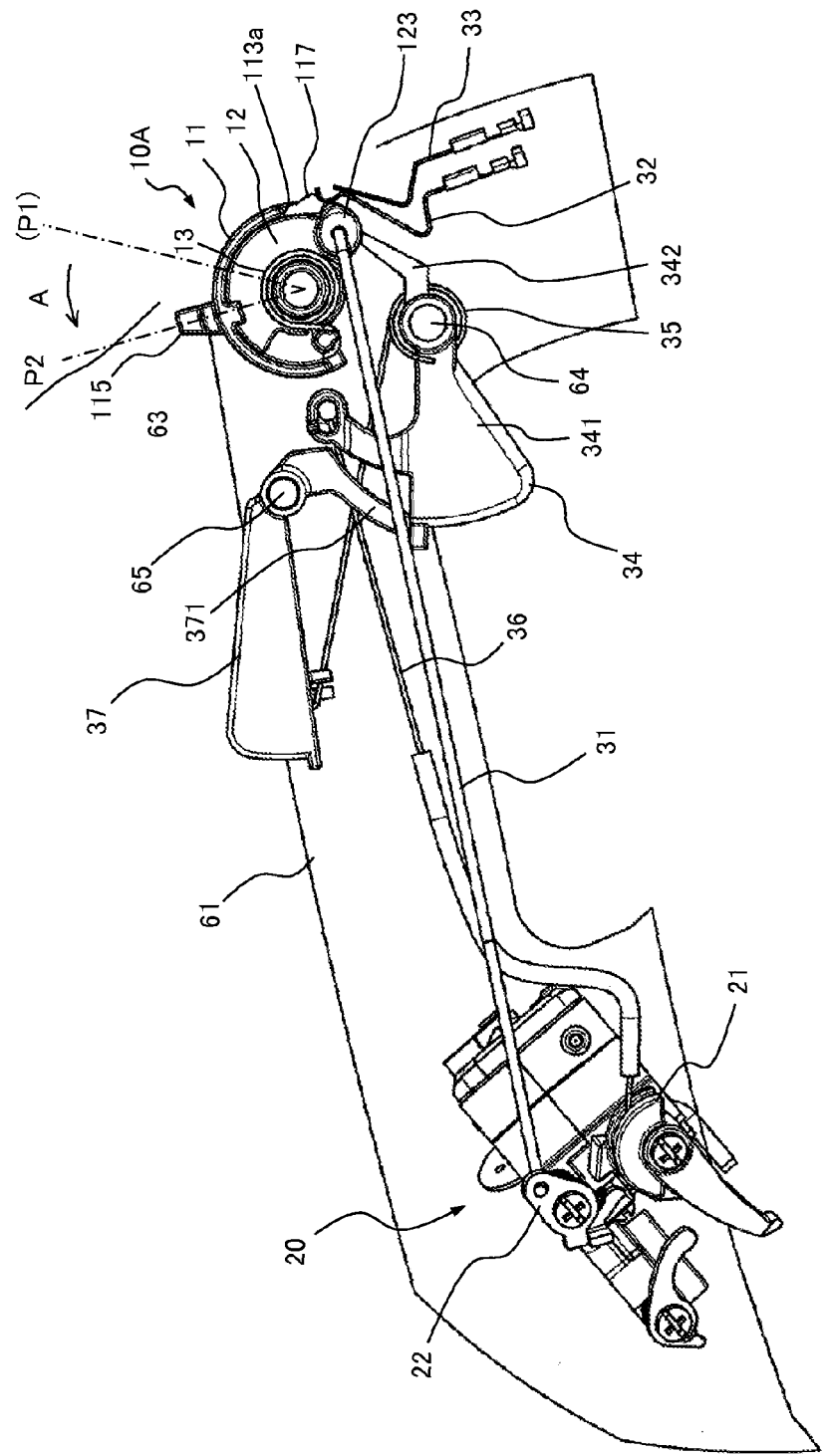
FIG. 6 is a diagram illustrating the states of the components inside the top handle when the operation lever is placed in the stop position in the first embodiment.
Figure 7:
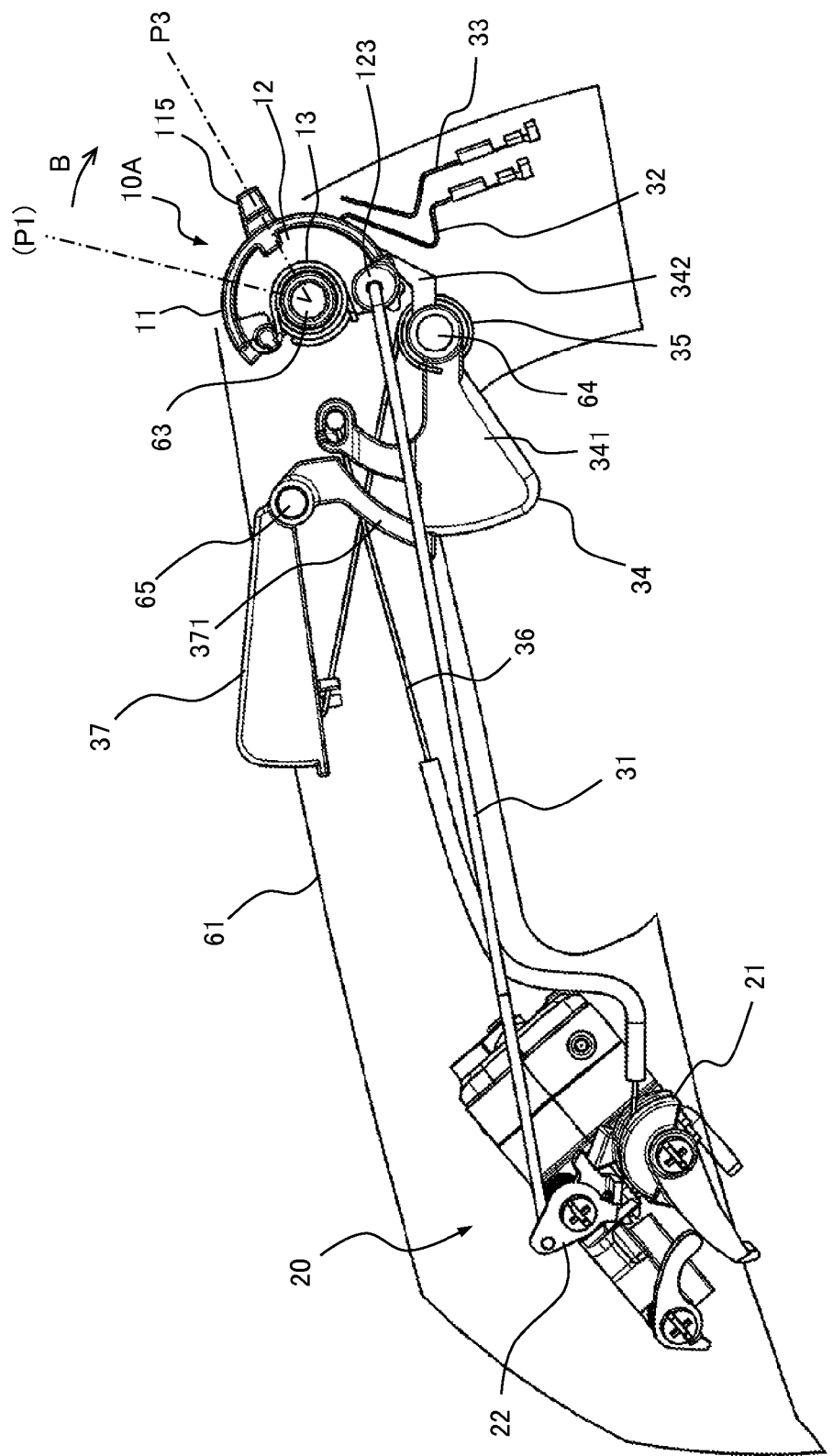
FIG. 7 is a diagram illustrating the states of the components inside the top handle when the operation lever is placed in the choke position in the first embodiment.
Figure 8:
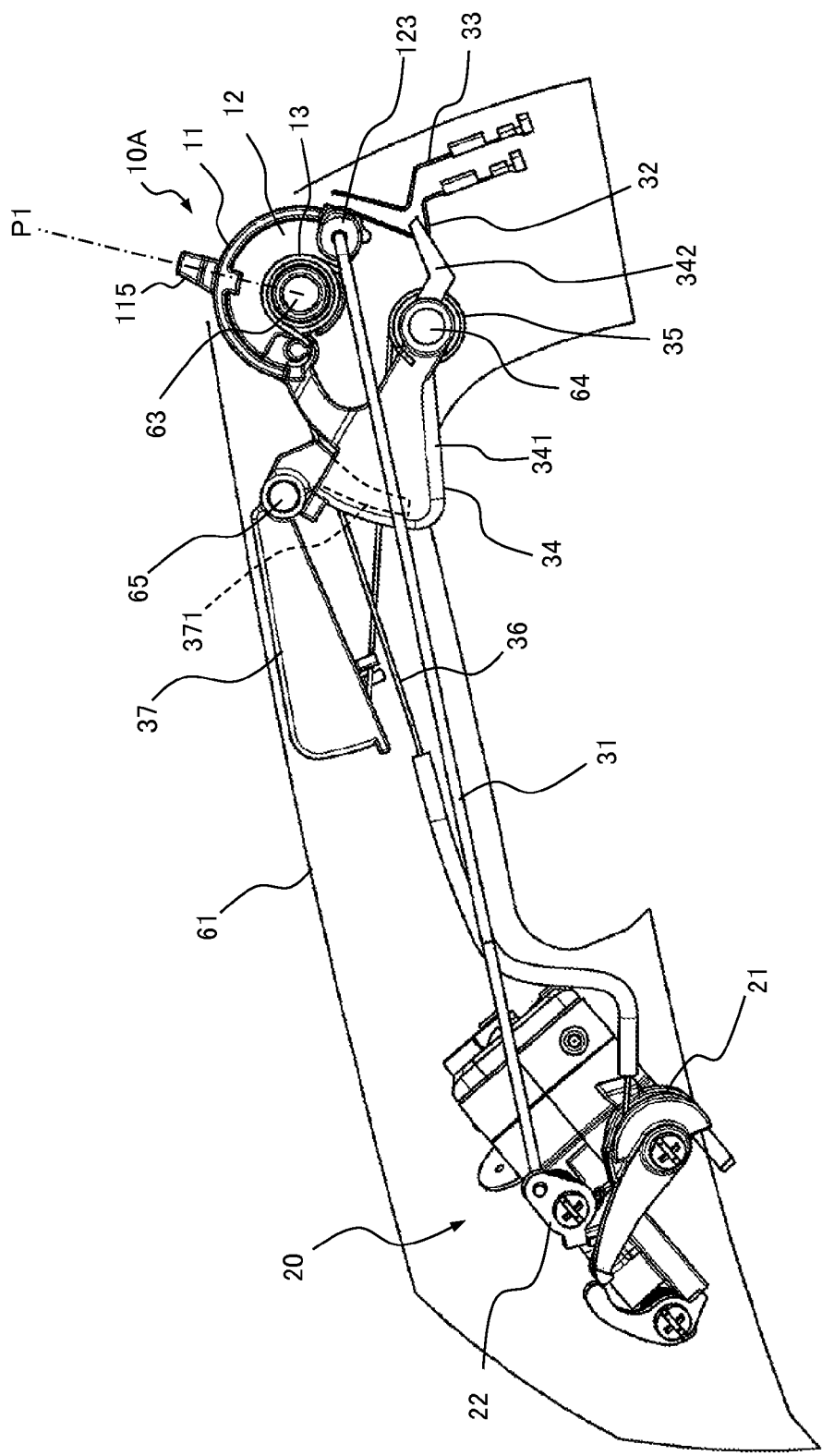
FIG. 8 is a diagram illustrating the states of the components inside the top handle in the wide open throttle (WOT) state in the first embodiment.
Figure 9:
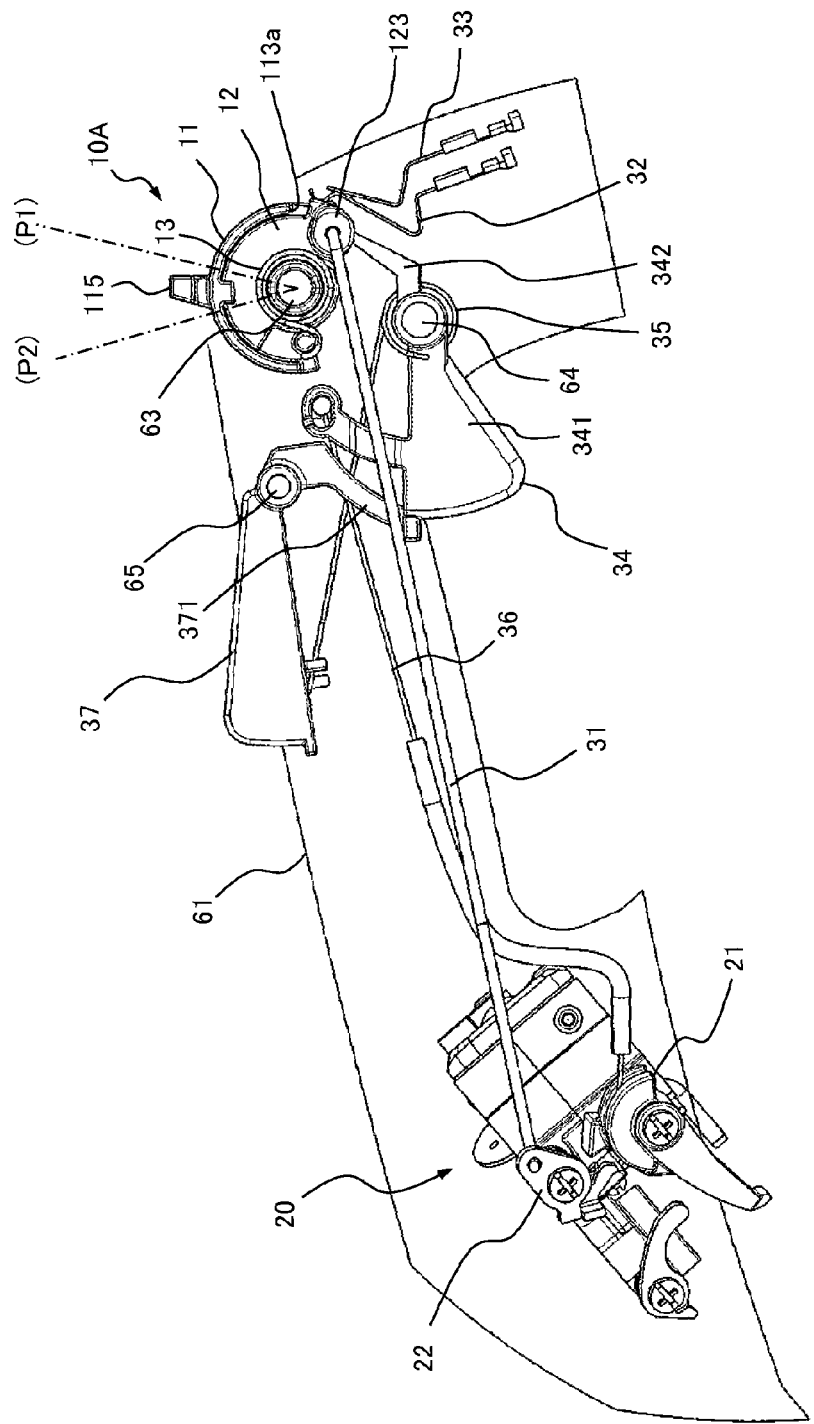
FIG. 9 is a diagram illustrating the states of the components inside the top handle when the operation lever is placed between the drive position and the stop position in the first embodiment.

The following describes the actions of the components of the top handle 6 caused by the operator's operations in the first embodiment with reference to FIGS. 2, and 6 to 9. FIG. 2 illustrates the states of the components when the operation lever 11 is placed in the drive position P1 as described above. FIG. 6 illustrates the states of the components when the operation lever 11 is placed in the stop position P2. FIG. 7 illustrates the states of the components when the operation lever 11 is placed in the choke position P3. FIG. 8 illustrates the states of the components when the throttle valve is fully open. FIG. 9 illustrates the states of the components when the operation lever 11 is placed between the drive position P1 and the stop position P2.

First, when the chainsaw 1 is stopped (non-operating time), in other words, when the internal combustion engine 2 is stopped, the operation lever 11 is placed in the stop position P2 (see FIG. 6). In this embodiment, the operator turns the operating projection 115 of the operation lever 11 in the direction of the arrow A from the state illustrated in FIG. 2 (drive position P1), thereby turning the operation lever 11 to the stop position P2. Note here that the turning member 12 is coupled to the choke operating member 22 via the choke rod 31, by which turning in the direction of the arrow A, that is, turning in the direction from the drive position P1 to the stop position P2, is regulated. Therefore, when turning the operation lever 11 from the drive position P1 to the stop position P2, the operator turns the operating projection 115 in the direction of the arrow A against the turning force (biasing force) imparted to the operation lever 11 by the torsion coil spring 13. Thereby, as illustrated in FIG. 6, the operating projection 115 of the operation lever 11 inclines backward and the abutment is released between the one end portion 113a of the peripheral wall 113 of the operation lever 11 and the outer peripheral surface of the boss portion 123 of the turning member 12.

When the operation lever 11 is placed in the stop position P2, the choke rod 31 is located on the most forward side and the throttle lever 34 and the lock lever 37 are placed in the respective initial positions as illustrated in FIG. 6. In the carburetor 20, the choke valve is released and the throttle valve is adjusted to, for example, an idle rotation opening degree. The primary-side plate-shaped terminal 32 is pressed at its free end (the curved portion) by the projection portion 117 of the operation lever 11 so as to be in contact with the ground-side plate-shaped terminal 33. In other words, the primary side of the ignition coil is short-circuited to ground, by which the ignition section is disabled.

Here, as illustrated in FIG. 6, when the operation lever 11 is placed in the stop position P2, the free end (the curved portion) of the primary-side plate-shaped terminal 32 enters into the downside of the projection portion 117 of the operation lever 11 to engage with the projection portion 117, thereby achieving the click stop of the operation lever 11 while maintaining the contact state with the ground-side plate-shaped terminal 33. Specifically, the primary-side plate-shaped terminal 32 is configured to function as a turning stopper that inhibits the turning in the direction toward the drive position P1 of the operation lever 11 placed in the stop position P2 (the direction of the arrow B). Thereby, although the torsion coil spring 13 imparts a turning force in the direction of returning to the drive position P1 to the operation lever 11, the operation lever 11 is held in the stop position P2 even when the operator releases the hand (fingers) from the operating projection 115.

Next, when starting the internal combustion engine 2 to activate the chainsaw 1, the operator brings down the brake lever 7 forward to activate the chain brake and pushes forward the operating projection 115 of the operation lever 11. Specifically, the operation lever 11 placed in the stop position P2 is turned by a given amount in the direction of the arrow B. This causes the projection portion 117 of the operation lever 11 to deflect the primary-side plate-shaped terminal 32 and the ground-side plate-shaped terminal 33 and to pass the free end (the curved portion) of the primary-side plate-shaped terminal 32, by which the click stop achieved by the primary-side plate-shaped terminal 32 is released. Thereafter, the operation lever 11 turns to the drive position P1 in the direction of the arrow B due to the turning force imparted by the torsion coil spring 13, in other words, even if the operator no longer presses the operating projection 115, and is placed in the state illustrated in FIG. 2 (FIG. 6→FIG. 2). Specifically, the operation lever 11 returns to the state in which the operating projection 115 of the operation lever 11 inclines forward and the one end portion 113a of the peripheral wall 113 of the operation lever 11 abuts the outer peripheral surface of the boss portion 123 of the turning member 12 from above.

When the operation lever 11 turns from the stop position P2 to the drive position P1, the pressing to the primary-side plate-shaped terminal 32 by the projection portion 117 of the operation lever 11 is released and the primary-side plate-shaped terminal 32 and the ground-side plate-shaped terminal 33 are separated from each other as illustrated in FIG. 2. Thereby, the ignition section is enabled and the internal combustion engine 2 becomes ready to be operated (started). The positions of the choke rod 31, the throttle lever 34, and the lock lever 37 are the same as those when the operation lever 11 is placed in the stop position P2. Therefore, in the carburetor 20, the choke valve is released and the throttle valve is adjusted to the idle rotation opening degree. Normally, the operator pulls a recoil starter (not illustrated) in this state, thereby starting the internal combustion engine 2.

In a case in which the internal combustion engine 2 is in a cold machine condition or the like, however, the operator performs a choke operation in order to facilitate the start of the internal combustion engine 2. More specifically, the operator releases the turning inhibition of the operation lever 11 performed by the turning inhibiting section 342 of the throttle lever 34 by pushing in the lock lever 37, first, and then slightly pulling the throttle lever 34. Thereafter, the operator pushes forward the operating projection 115 of the operation lever 11 placed in the drive position P1 to turn the operation lever 11 up to the choke position P3 in the direction of the arrow B (FIG. 2→FIG. 7).

The one end portion 113a of the peripheral wall 113 of the operation lever 11 abuts the outer peripheral surface of the boss portion 123 of the turning member 12 from above (see FIG. 3). When the operation lever 11 is turned from the drive position P1 to the choke position P3, the turning member 12 also turns along with the operation lever 11. With this turning of the turning member 12, the choke rod 31 moves in the axial direction, specifically, moves backward from the most forward position described above (see FIGS. 2 and 6) and the choke operating member 22 closes the choke valve due to the movement of the choke rod 31. Furthermore, in this condition, the start-assist mechanism incorporated in the carburetor 20 slightly opens the throttle valve.

Then, after performing this choke operation, the operator pulls the recoil starter and pulls back the operating projection 115 of the operation lever 11, for example, after the initial explosion of the internal combustion engine 2 to turn the operation lever 11 up to the drive position P1 in the direction of the arrow A (FIG. 7→FIG. 2). Thereby, the turning member 12 turns along with the operation lever 11, and the choke rod 31 returns to the most forward position described above (the choke valve is opened). If the rotation of the internal combustion engine 2 continues after the initial explosion, the operator pulls the recoil starter again to start the internal combustion engine 2. Thereafter, the operator pushes in the lock lever 37 and pulls the throttle lever 34, thereby releasing the interlock between the choke valve and the throttle valve by the start-assist mechanism and completing the start of the internal combustion engine 2.

Upon the completion of the start of the internal combustion engine 2, the operator releases the chain brake by pulling the brake lever 7 toward the operator. Then, the operator pushes in the lock lever 37 and pulls the throttle lever 34 as needed to adjust the opening degree of the throttle valve, thereby enabling the control of the output (the number of rotations) of the internal combustion engine 2. FIG. 8 illustrates the wide open throttle (WOT) state in which the throttle valve is fully opened by operating the throttle lever 34 up to a full operation.

Moreover, the operator is able to disable the ignition section to stop the internal combustion engine 2 by pulling back the operating projection 115 of the operation lever 11 to turn the operation lever 11 from the drive position P1 to the stop position P2 during the operation of the internal combustion engine 2. In this embodiment, when the operation lever 11 is turned from the drive position P1 to the stop position P2, the internal combustion engine 2 is stopped even in a position before the stop position P2. Specifically, as illustrated in FIG. 9, when the operation lever 11 is turned from the drive position P1 to the stop position P2, the projection portion 117 of the operation lever 11 starts to press the primary-side plate-shaped terminal 32 even in a position before the stop position P2, so that the primary-side plate-shaped terminal 32 and the ground-side plate-shaped terminal 33 are brought into contact with each other. If the internal combustion engine 2 is stopped short of the stop position P2 and then the operator releases the hand (fingers) from the operating projection 15 (in other words, the turning operation force is removed), the operation lever 11 returns to the drive position P1 due to the turning force imparted to the operation lever 11 by the torsion coil spring 13.

In the chainsaw 1 described above, the operator is able to switch among the stop, drive, and choke operations of the internal combustion engine 2 by turning the operation lever 11 to the stop position P1, the drive position P2, and the choke position P3.

Note here that the operation lever 11 and the turning member 12 that is turnably combined with the operation lever 11 are held so as to abut each other due to the turning force imparted by the torsion coil spring 13. Moreover, the turning member 12 is regulated in turning in the direction from the drive position P1 to the stop position P2 by the coupling with the choke rod 31. Then, when the operation lever 11 is turned from the drive position P1 to the choke position P3 in the direction of the arrow B, the turning member 12 turns along with the operation lever 11 to move the choke rod 31, by which the choke operating member 22 closes the choke valve. On the other hand, the turning operation of the operation lever 11 from the drive position P1 to the stop position P2 is performed against the turning force imparted to the operation lever 11 by the torsion coil spring 13.

Moreover, in this embodiment, the choke rod 31 having one end coupled to the choke operating member 22 has the other end constantly coupled to the turning member 12, and the other end does not move relatively to the turning member 12. Therefore, movement of the choke rod 31 along with the turning of the turning member 12 can be stably performed. This enables the reliable and stable choke operation via the choke rod 31 in comparison with the conventional technique. Moreover, the other end of the choke rod 31 does not get caught in or does not scrape with the turning member 12, thereby suppressing the decrease in durability of the components.

Furthermore, the operation lever 11 is turnably supported by the first support shaft 63 erected inside the top handle 6 and the turning member 12 is combined with the operation lever 11 so as to be able to turn around the first support shaft 63. This enables the operation lever 11 and the turning member 12 to be compactly arranged inside the top handle 6.

Moreover, the operation lever 11 has a cylindrical shaft portion 112 with a shaft insertion hole 111 through which the first support shaft 63 can be inserted. The turning member 12 is turnably supported by the cylindrical shaft portion 112 of the operation lever 11 via a through hole 121. Furthermore, the torsion coil spring 13 is attached to the cylindrical shaft portion 112 of the operation lever 11 exposed (projecting) from the through hole 121 of the turning member 12, and the hook portions 132 and 133 of the torsion coil spring 13 are hooked on the operation lever 11 and the turning member 12 to couple the operation lever 11 to the turning member 12 and to impart relative turning forces to the operation lever 11 and the turning member 12. This enables the operation lever 11, the turning member 12, and the torsion coil spring 13 to be compactly integrated and to be mounted on (the first support shaft 63 of) the top handle 6.

Moreover, the operation lever 11 has a projection portion 117, which projects outward in a radial direction of the shaft insertion hole 111 (the first support shaft 63). When the operation lever 11 is in the stop position P2, the projection portion 117 presses the primary-side plate-shaped terminal 32 so as to bring the primary-side plate-shaped terminal 32 into contact with the ground-side plate-shaped terminal 33 to disable the ignition section. Thus, the operation lever 11 is turned from the drive position P1 to the stop position P2, thereby enabling the internal combustion engine 2 to be easily and reliably stopped. In particular, in this embodiment, when the operation lever 11 is turned from the drive position P1 to the stop position P2, the projection portion 117 presses the primary-side plate-shaped terminal 32 even in a position before the stop position P2, to disable the ignition section. This enables the internal combustion engine 2 under the operation to be quickly stopped and the operation lever 11 to be placed in the drive position P1 after the stop of the internal combustion engine 2, and therefore, for example, the internal combustion engine 2 is able to be restarted more quickly.

In this embodiment, the primary-side plate-shaped terminal 32 has a function as a turning stopper that inhibits the turning of the operation lever 11 in the direction from the stop position P2 to the drive position P1 by engaging with (the projection portion 117 of) the operation lever 11 placed in the stop position P2. This enables the operation lever 11 to which the turning force in a direction of returning to the drive position P1 is imparted by the torsion coil spring 13 to be held in the stop position P2.

On the other hand, the turning stopper (turning inhibition) of the operation lever 11 with the primary-side plate-shaped terminal 32 is released by slightly turning the operation lever 11 placed in the stop position P2 toward the drive position P1. Thereafter, the operation lever 11 is turned up to the drive position P1 due to the turning force imparted by the torsion coil spring 13. This enables the operation lever 11 to be turned from the stop position P2 to the drive position P1 easily and quickly, thereby enabling the internal combustion engine 2 placed in the stop state to be quickly started.

Second Embodiment

Next, a second embodiment of the present invention will be described.

In the second embodiment, the operating directions (turning directions) of the operating unit to stop an internal combustion engine 2 and to perform the choke operation, are opposite to those of the first embodiment. The others are basically the same as those of the first embodiment. In the following description, the same reference numerals are used for the same parts as in the first embodiment, and the description thereof is omitted here.

Figure 10:
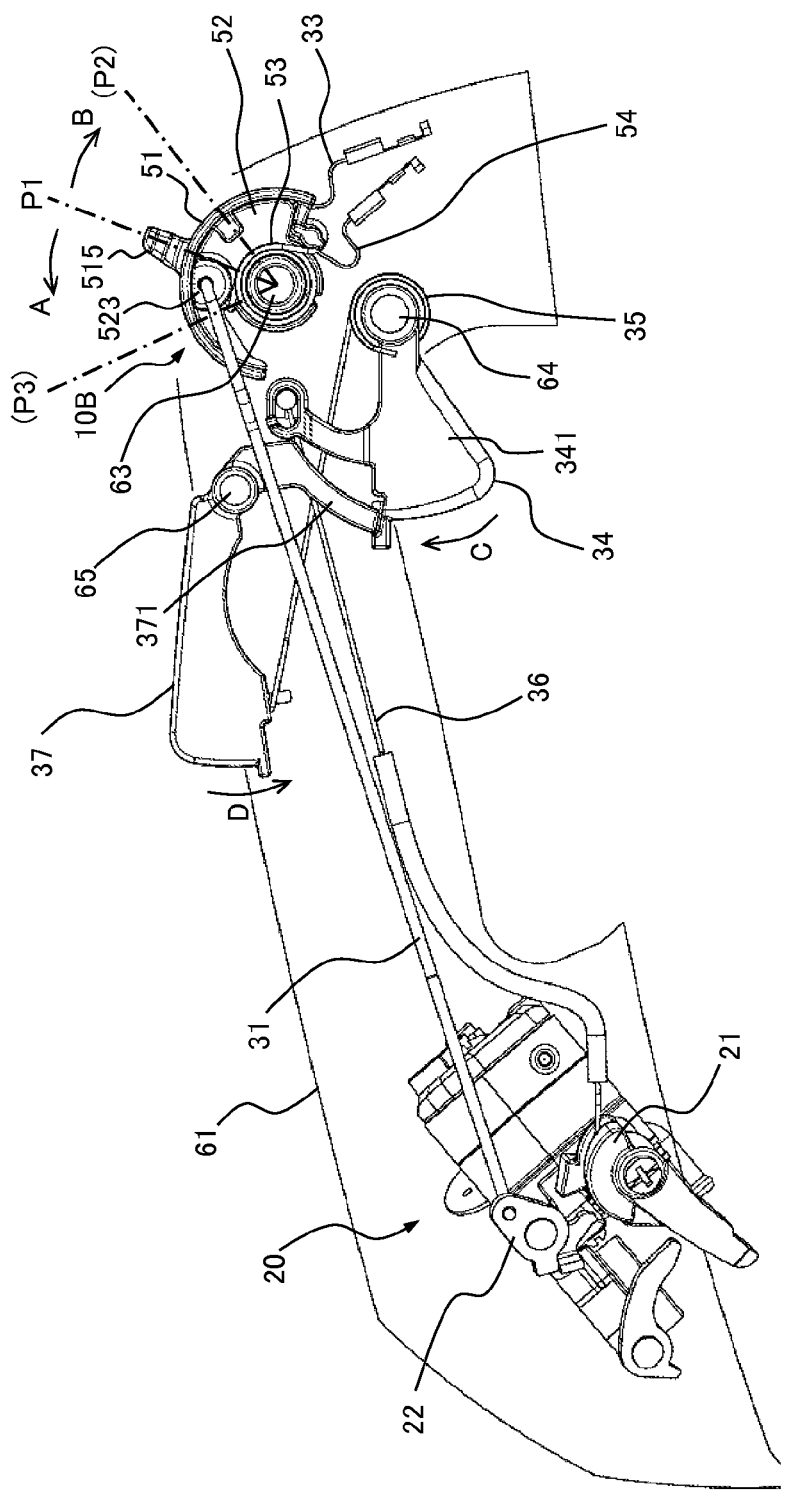
FIG. 10 is an enlarged view illustrating the internal structure of a top handle of the chainsaw in a second embodiment.
Figure 11:
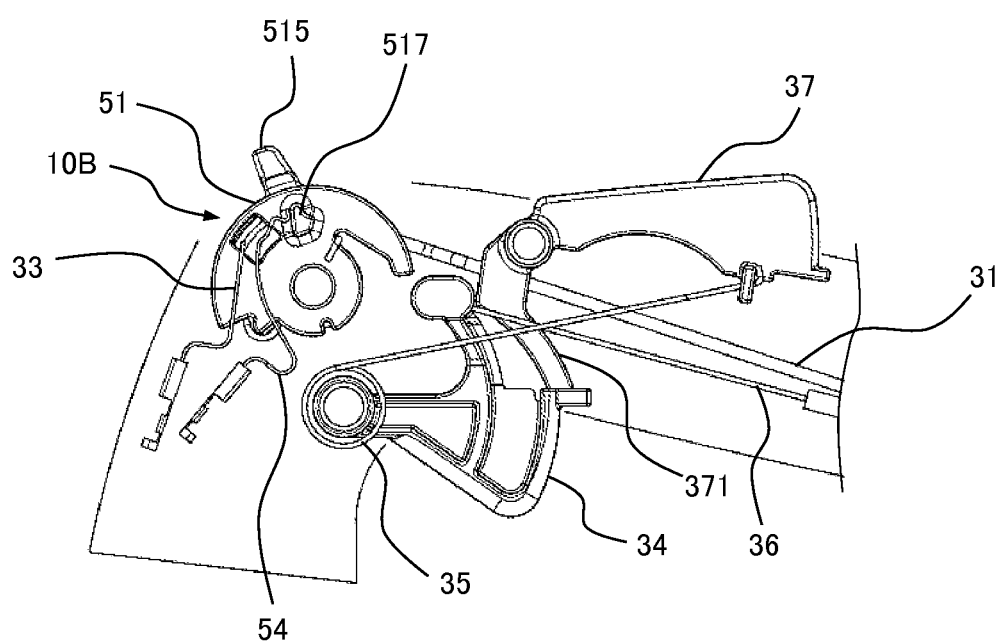
FIG. 11 is an enlarged view illustrating the main part of the internal structure of the top handle of the chainsaw viewed from the opposite side to that of FIG. 10.

FIG. 10 is an enlarged view illustrating the internal structure of a top handle 6 in the second embodiment. In addition, FIG. 11 is an enlarged view illustrating the main part of the internal structure of the top handle 6 viewed from the opposite side (the left side surface side of a chainsaw 1) to the view in FIG. 10.

As illustrated in FIG. 10, an operating unit 10B in this embodiment also has an operation lever 51, a turning member 52, and a torsion coil spring (coupling biasing member) 53 similarly to the operating unit 10A in the first embodiment, and they are integrated and attached to a first support shaft 63 erected inside the top handle 6 (left casing 61). The operation lever 51 is turnably supported by the first support shaft 63, and the turning member 52 is turnably combined with the operation lever 51. The torsion coil spring 53 couples the operation lever 51 to the turning member 52 and imparts relative turning forces (biasing forces) to both of the operation lever 51 and the turning member 52. The operation lever 51 and the turning member 52 are held in a state of abutting each other due to the turning forces imparted by the torsion coil spring 53. Normally, the operation lever 51 and the turning member 52 turn in a unified manner. Note that, however, it is also possible to cause only the operation lever 51 to turn without the turning of the turning member 52 similarly to the operating unit 10A in the first embodiment.

Figure 12:
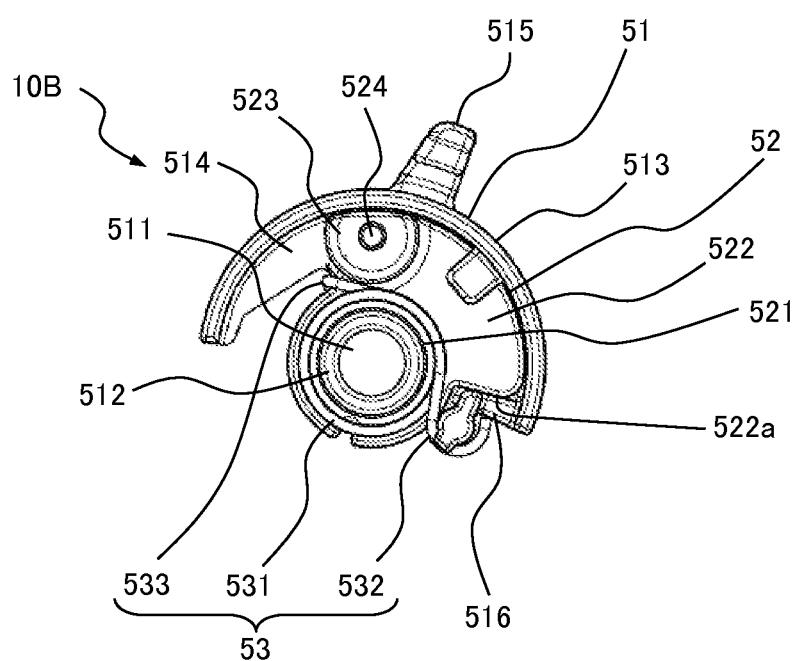
FIG. 12 is an enlarged view of an operating unit of the chainsaw in the second embodiment.
Figure 13:
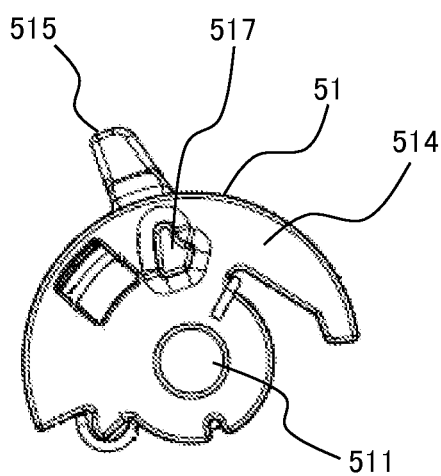
FIG. 13 is an enlarged view of the operating unit viewed from the opposite side to that of FIG. 12.

FIGS. 12 and 13 are enlarged views each illustrating the configuration of the operating unit 10B. FIG. 12 is an overall view (assembly diagram) of the operating unit 10B, and FIG. 13 illustrates a state in which the operating unit 10B is viewed from the opposite side to that in FIG. 12.

The operation lever 51 is formed of, for example, synthetic resin similarly to the operation lever 11 in the first embodiment, and includes a cylindrical shaft portion 512 with a shaft insertion hole 511 through which the first support shaft 63 can be inserted, a peripheral wall 513 arranged outward in a radial direction of the cylindrical shaft portion 512, and a coupling portion 514 that couples the cylindrical shaft portion 512 to the peripheral wall 513 on one end side in the axial direction of the cylindrical shaft portion 512. The cylindrical shaft portion 512 and the peripheral wall 513 have almost the same shapes as those of the cylindrical shaft portion 112 and the peripheral wall 113 of the operation lever 11 in the first embodiment, and an operating projection 515 is projected on the outer surface of the peripheral wall 513. In this embodiment, however, one end of the peripheral wall 513 in the circumferential direction is connected to a wall 516 formed in the coupling portion 514. The wall 516 is formed so as to extend from the one end of the peripheral wall 513 toward the cylindrical shaft portion 512. On the back side of the coupling portion 514, a protruding portion 517 projected from the back surface is formed instead of the stepped face portion 116 and the projection portion 117 in the first embodiment (see FIGS. 11 and 13).

Similarly to the turning member 12 of the first embodiment, the turning member 52 is formed of, for example, synthetic resin, and includes a substantially flat plate-like flat plate portion 522 with a through hole 521 through which the cylindrical shaft portion 512 of the operation lever 51 can be inserted and a boss portion 523 erected on one surface (a surface on the opposite side to the operation lever 51 side) of the flat plate portion 522. The flat plate portion 522 is formed so as to have an arcuate outer edge having a smaller diameter than the peripheral wall 513 of the operation lever 51. On the top face of the boss portion 523, there is formed a rod insertion hole 524 through which one end of the choke rod 31 is inserted.

The torsion coil spring 53 includes a coil portion 531 through which the cylindrical shaft portion 512 of the operation lever 51 can be inserted (in other words, having an inner diameter greater than the outer diameter of the cylindrical shaft portion 112), a first hook portion 532 that is pulled out (extends) from one end side of the coil portion 531 and is hooked on the operation lever 51, and a second hook portion 533 that is pulled out (extends) from the other end side of the coil portion 531 and is hooked on the turning member 52.

The operation lever 51, the turning member 52, and the torsion coil spring 53 are integrated in the same manner as the first embodiment to constitute the operating unit 10B. In this condition, the operation lever 51 and the turning member 52 are held in a state of abutting each other due to the turning forces imparted by the torsion coil spring 53. Specifically, as illustrated in FIG. 12, the operation lever 51 and the turning member 52 are held with the wall 516 of the operation lever 51 abutting one end 522a of the flat plate portion 522 of the turning member 52. Similarly to the operating unit 10A in the first embodiment, the operating unit 10B is attached to the first support shaft 63 via the shaft insertion hole 511 of the cylindrical shaft portion 512 of the operation lever 51, and the turning member 52 is coupled to a choke operating member 22 of a carburetor 20 via a rod-shaped choke rod 31 extending in the front-back direction inside the top handle 6 (see FIG. 10).

In this embodiment, the operation lever 51 is configured to be able to turn to the drive position P1 illustrated in FIG. 10, the stop position P2 where the operation lever 51 is turned by a given amount in the direction of the arrow B from the drive position P1, and the choke position P3 where the operation lever 51 is turned by a given amount in the direction of the arrow A from the drive position P1. In the top handle 6, there are provided a pair of plate-shaped terminals (a primary-side plate-shaped terminal 54 and a ground-side plate-shaped terminal 33) for disabling an ignition section (not illustrated) of the internal combustion engine 2 in the front lower part of the first support shaft 63 (and the operating unit 10B attached thereto). Note here that the primary-side plate-shaped terminal 54 has a free end abutting the protruding portion 517 of the operation lever 51 (see FIG. 11). The primary-side plate-shaped terminal 54 has a shape different from that of the primary-side plate-shaped terminal 32 of the first embodiment, although their functions are basically the same as each other.

Figure 14:
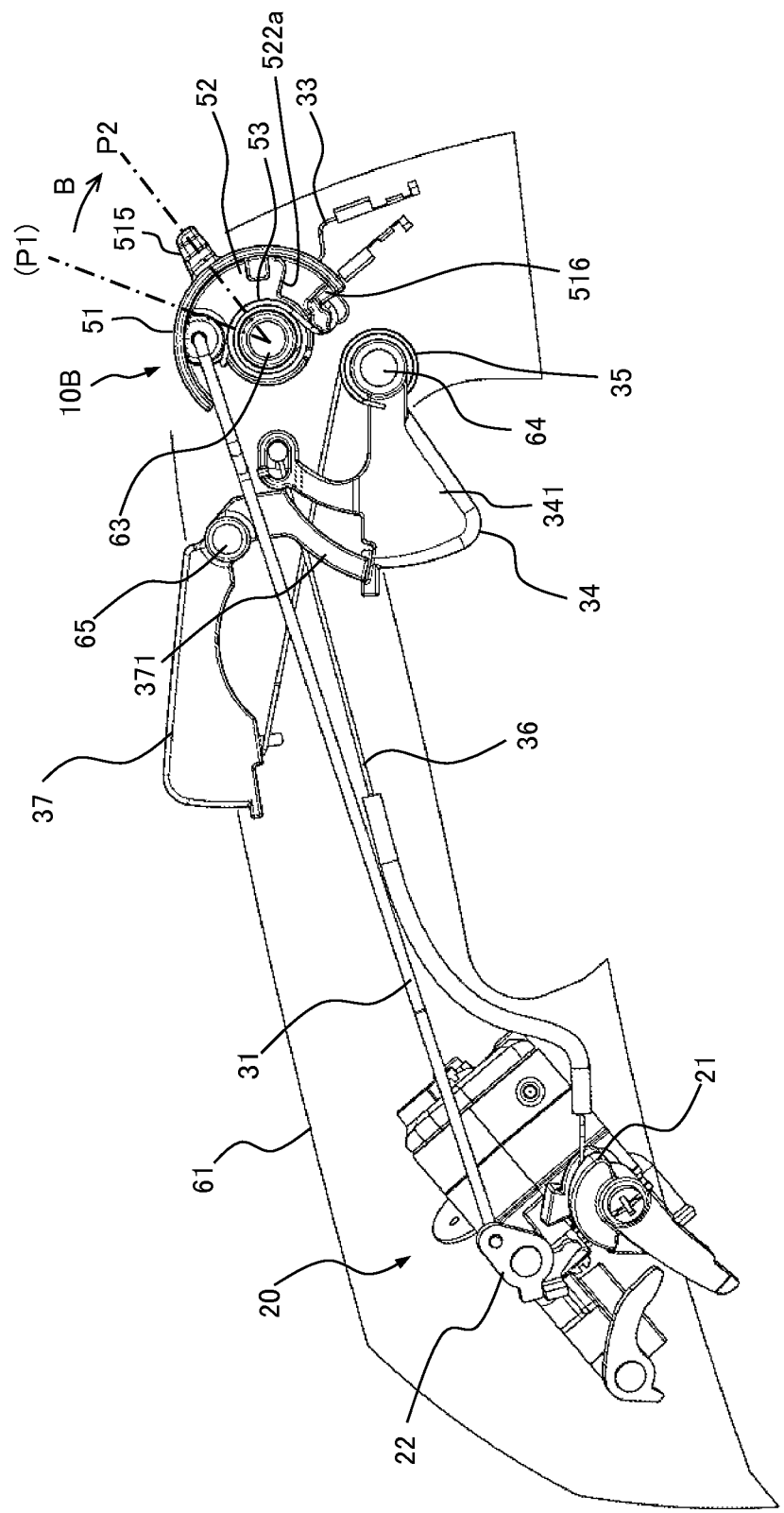
FIG. 14 is a diagram illustrating the states of the components inside the top handle when the operation lever constituting the operating unit is placed in the stop position in the second embodiment.
Figure 15:
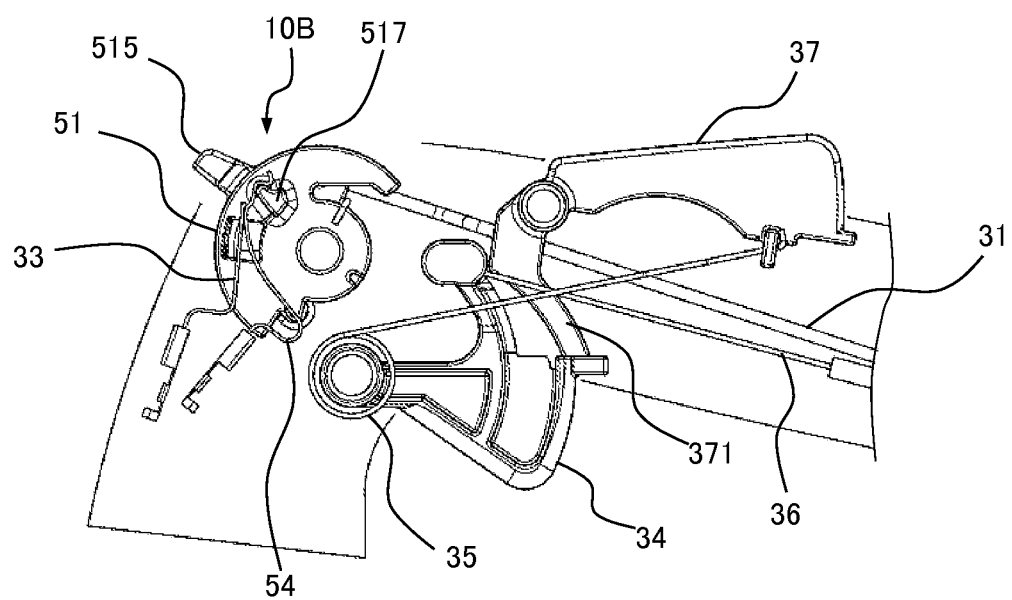
FIG. 15 is a main part view illustrating the states of the components inside the top handle viewed from the opposite side to that of FIG. 14.
Figure 16:
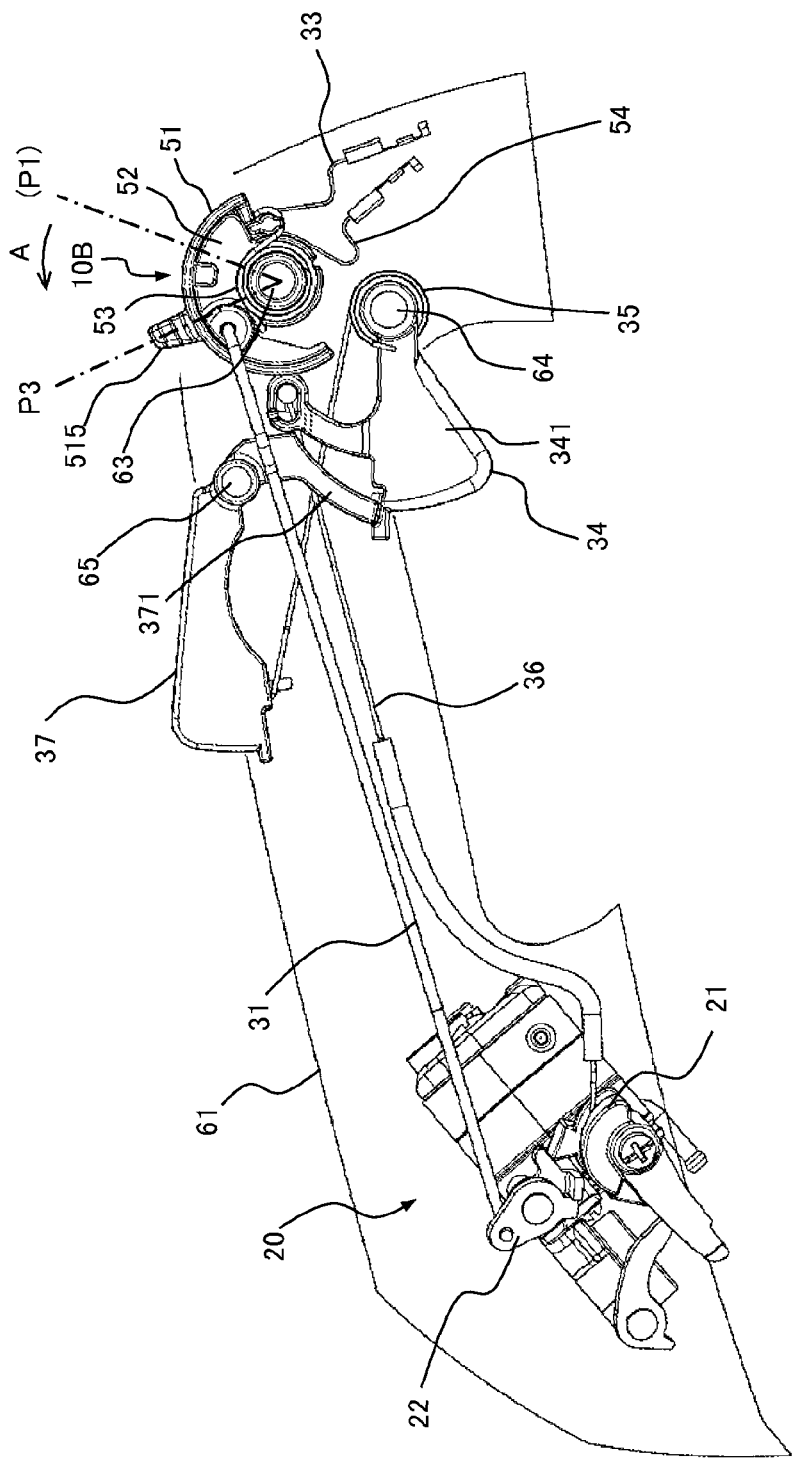
FIG. 16 is a diagram illustrating the states of the components inside the top handle when the operation lever is placed in the choke position in the second embodiment.
Figure 17:
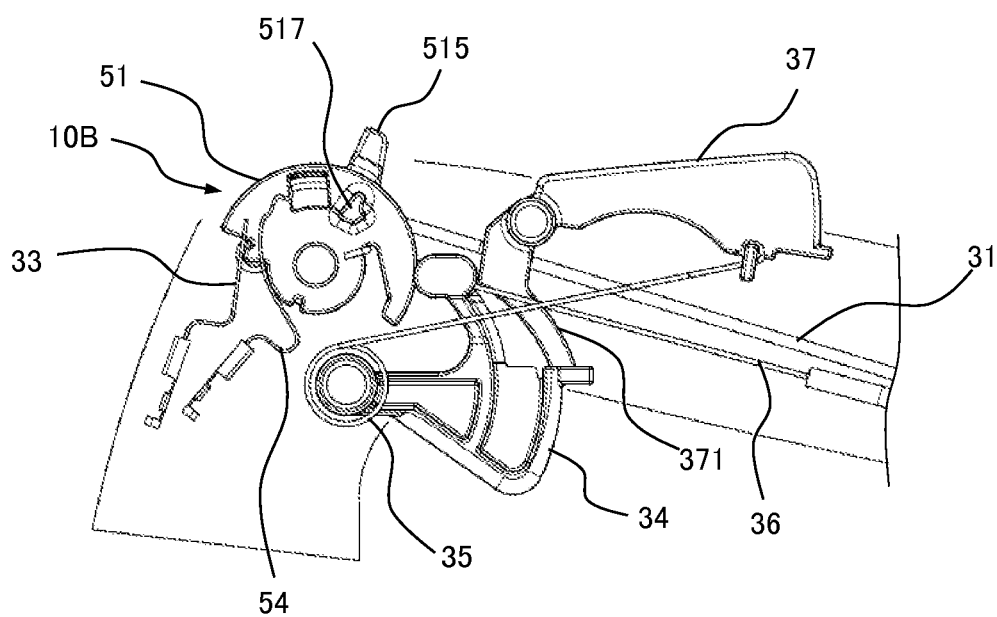
FIG. 17 is a main part view illustrating the states of the components inside the top handle viewed from the opposite side to that of FIG. 16.
Figure 18:
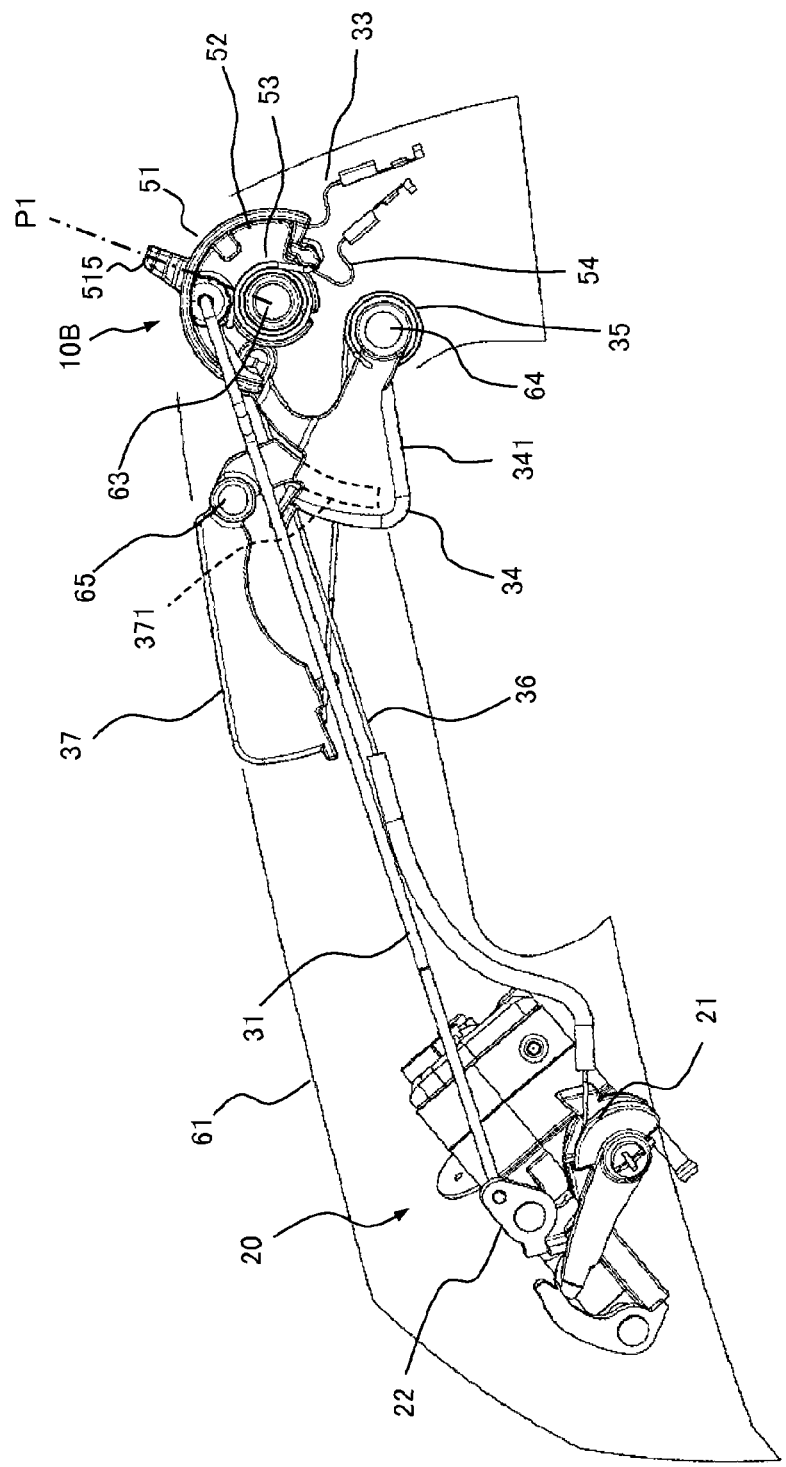
FIG. 18 is a diagram illustrating the states of the components inside the top handle in the wide open throttle (WOT) state in the second embodiment.
Figure 19:
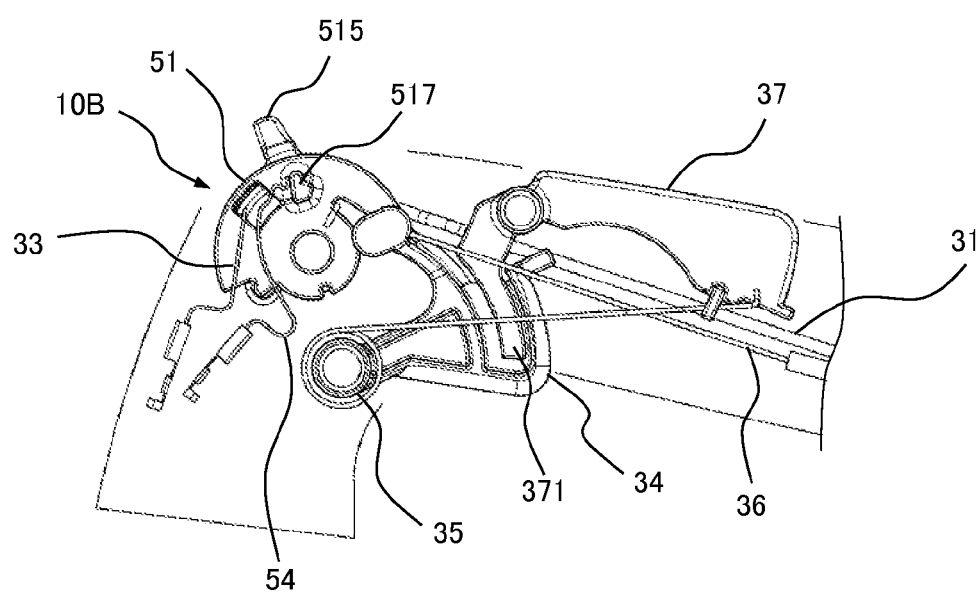
FIG. 19 is a main part view illustrating the states of the components inside the top handle viewed from the opposite side to that of FIG. 18.
Figure 20:
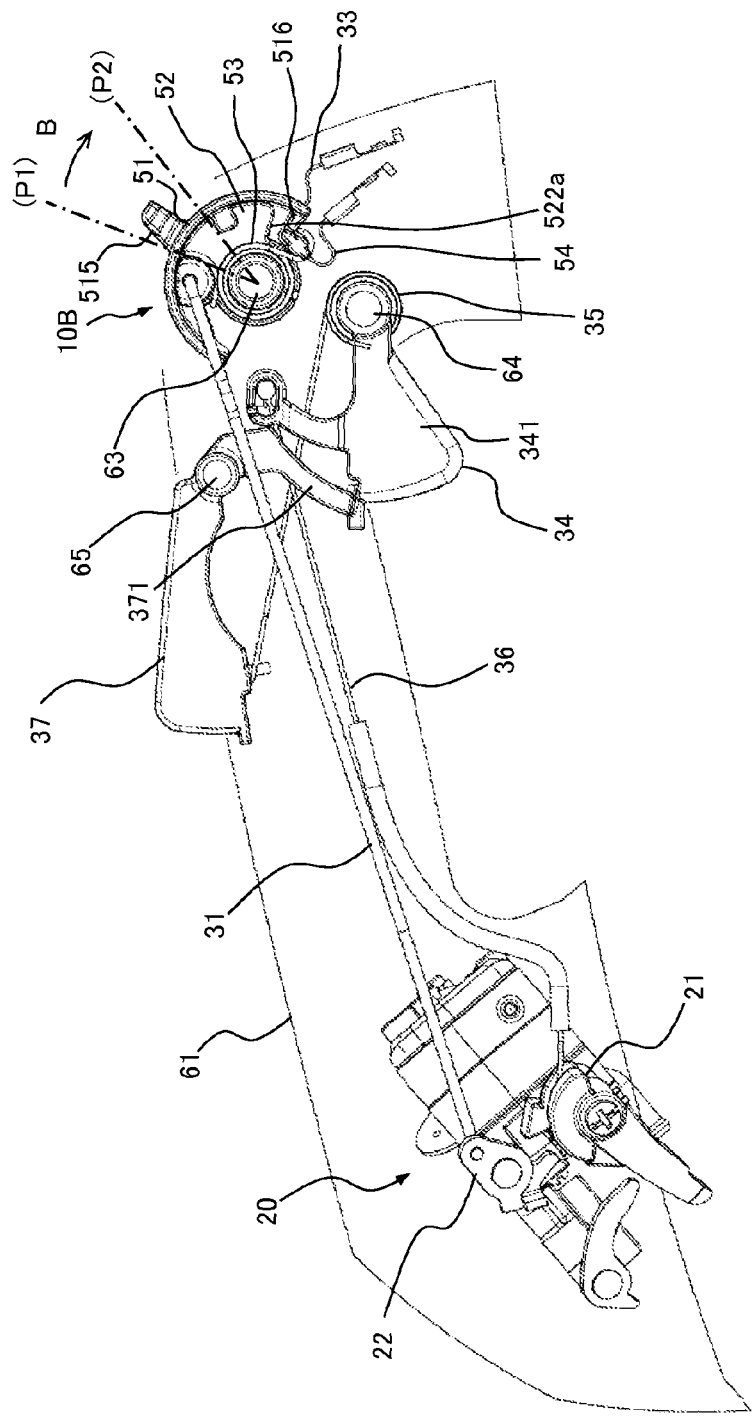
FIG. 20 is a diagram illustrating the states of the components inside the top handle when the operation lever is placed between the drive position and the stop position in the second embodiment.
Figure 21:
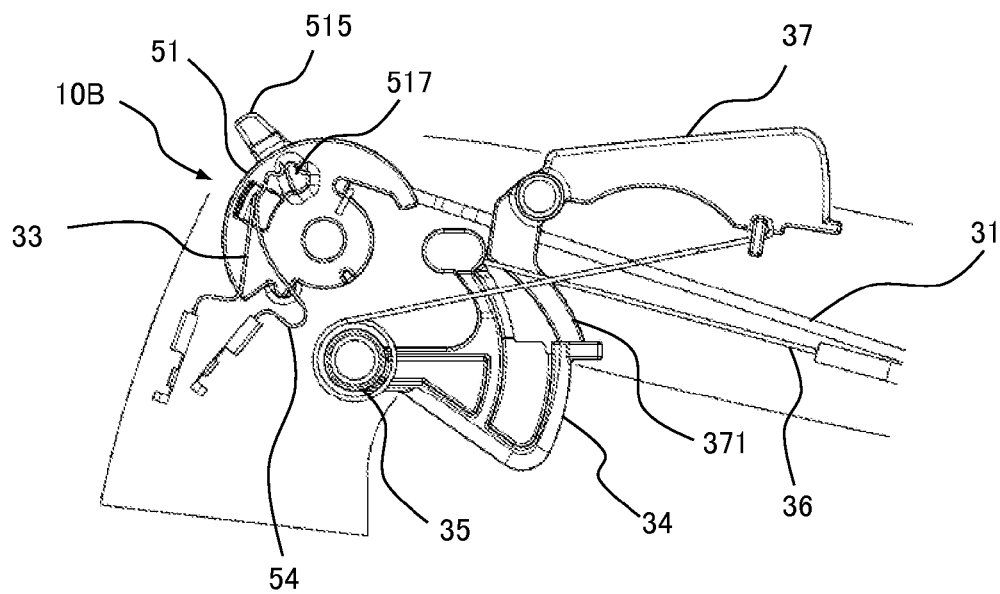
FIG. 21 is a main part view illustrating the states of the components inside the top handle viewed from the opposite side to that of FIG. 20.

The following describes the actions of the components of the top handle 6 caused by the operator's operations in the second embodiment with reference to FIGS. 10, 11, and 14 to 21. FIGS. 10 and 11 illustrate the states of the components when the operation lever 51 is placed in the drive position P1. FIGS. 14 and 15 illustrate the states of the components when the operation lever 51 is placed in the stop position P2. FIGS. 16 and 17 illustrate the states of the components when the operation lever 51 is placed in the choke position P3. FIGS. 18 and 19 illustrate the states of the components when the throttle valve is fully opened. FIGS. 20 and 21 illustrate the states of the components when the operation lever 51 is placed between the drive position P1 and the stop position P2. FIGS. 14, 16, 18, and 20 correspond to FIG. 10, and FIGS. 15, 17, 19, and 21 correspond to FIG. 11.

When the chainsaw 1 is stopped (non-operating time), in other words, when the internal combustion engine 2 is stopped, the operation lever 51 is in the stop position P2 (see FIGS. 14 and 15). In this embodiment, an operator pushes an operating projection 515 of the operation lever 51 placed in the drive position P1 forward to turn the operation lever 51 in the direction of the arrow B, thereby turning the operation lever 51 to the stop position P2. Note here that the turning member 52 is regulated in turning in the direction of the arrow B by the choke rod 31. Therefore, the operator moves the operating projection 515 in the direction of the arrow B against the turning force (biasing force) imparted to the operation lever 51 by the torsion coil spring 53. Thereby, as illustrated in FIG. 14, the operating projection 515 of the operation lever 51 largely inclines forward and the abutment is released between the wall 516 of the operation lever 51 and one end 522a of the flat plate portion 522 of the turning member 52.

When the operation lever 51 is placed in the stop position P2, the components other than the operating unit 10B are basically the same as those of the first embodiment. For example, the choke rod 31 is located on the most forward side, and the throttle lever 34 and the lock lever 37 are located in the respective initial positions. As illustrated in FIG. 15, the primary-side plate-shaped terminal 54 is pressed on its free end side by the protruding portion 517 of the operation lever 51 so as to be brought into contact with the ground-side plate-shaped terminal 33 (the ignition section is disabled). Furthermore, the primary-side plate-shaped terminal 54 maintains the contact state with the ground-side plate-shaped terminal 33 while engaging with the protruding portion 517 of the operation lever 51 placed in the stop position P2 to perform the click stop of the operation lever 51, thereby inhibiting the operation lever 51 in the stop position P2 to turn toward the drive position P1 (see FIG. 15).

When starting the internal combustion engine 2, the operator brings down the brake lever 7 forward to activate the chain brake and pulls the operating projection 515 of the operation lever 51, placed in the stop position P2, backward to turn the operation lever 51 in the direction of the arrow A. Thereupon, the click stop caused by the primary-side plate-shaped terminal 54 is released and thereafter the operation lever 51 turns to the drive position P1 in the direction of the arrow A due to the turning force imparted by the torsion coil spring 53 (FIG. 14→FIG. 10). When the operation lever 51 turns from the stop position P2 to the drive position P1, the pressing on the primary-side plate-shaped terminal 54 with the protruding portion 517 of the operation lever 51 is released or decreased, by which the primary-side plate-shaped terminal 54 and the ground-side plate-shaped terminal 33 are separated from each other (see FIG. 11). Thereby, the ignition section is enabled and the internal combustion engine 2 becomes ready to be operated (started). The operator pulls the recoil starter in this state, thereby starting the internal combustion engine 2.

On the other hand, the operator performs a choke operation before starting the internal combustion engine 2 in a case in which the internal combustion engine 2 is in the cold machine condition or the like. In this case, the operator pulls the operating projection 515 of the operation lever 51, placed in the drive position P1, backward to turn the operation lever 51 in the direction of the arrow A, thereby turning the operation lever 51 to the choke position P3 (FIG. 10→FIG. 16).

In the operating unit 10B, the wall 516 of the operation lever 51 abuts one end 522a of the flat plate portion 522 of the turning member 52 (see FIG. 12). When the operation lever 51 is turned from the drive position P1 to the choke position P3, the turning member 52 also turns along with the operation lever 51. Thereupon, the choke rod 31 moves in the axial direction along with the turning of the turning member 52, in other words, it moves backward from the most forward position described above (see FIGS. 10 and 14) and then the choke operating member 22 closes the choke valve due to the movement of the choke rod 31. At this time, the start-assist mechanism incorporated in the carburetor 20 slightly opens the throttle valve. Processing performed by the operator after that (processing starting the internal combustion engine 2) is the same as that of the first embodiment.

Then, upon the completion of the start of the internal combustion engine 2, the operator releases the chain brake by pulling the brake lever 7 toward the operator. Thereafter, the operator pushes in the lock lever 37 and pulls the throttle lever 34 as needed to adjust the opening degree of the throttle valve, thereby enabling the control of the output (the number of rotations) of the internal combustion engine 2. FIGS. 18 and 19 illustrate the wide open throttle (WOT) state in which the throttle valve is fully open by operating the throttle lever 34 up to a full operation.

Moreover, the operator is able to disable the ignition section to stop the internal combustion engine 2 by pushing forward the operating projection 515 of the operation lever 51 to turn the operation lever 51 from the drive position P1 to the stop position P2 during the operation of the internal combustion engine 2. Similarly to the first embodiment, in this embodiment, when the operation lever 51 is turned from the drive position P1 to the stop position P2, the internal combustion engine 2 is then stopped even in a position before the stop position P2. Specifically, as illustrated in FIGS. 20 and 21, when the operation lever 51 is turned from the drive position P1 to the stop position P2, the protruding portion 517 of the operation lever 51 starts to press the primary-side plate-shaped terminal 54 even in a position before the stop position P2, so that the primary-side plate-shaped terminal 54 and the ground-side plate-shaped terminal 33 are brought into contact with each other. If the operator releases the hand (fingers) from the operating projection 15 before the operation lever 51 turns to the stop position P2, in other words, before the operation lever 51 is click-stopped by the primary-side plate-shaped terminal 54, the operation lever 51 returns to the drive position P1 due to the turning force imparted to the operation lever 51 by the torsion coil spring 53.

Also in this embodiment (second embodiment), the present invention has the same advantageous effects as those of the first embodiment.

Although the present invention has been described with reference to exemplary embodiments, it is to be understood that the invention is not limited to the disclosed exemplary embodiments, and naturally, further changes and modifications may be made based on the technical concept of the present invention. For example, while the invention has been described in a case in which the working machine is a chainsaw in the above embodiments, the present invention is widely applicable to a working machine using an internal combustion engine provided as a power source.

As described above, in the working machine to which the present invention is applied, the choke rod having one end coupled to the choke operating member has the other end being held in a state of being constantly coupled to the turning member and the other end does not move relatively to the turning member. Therefore, in particular, the choke rod can be stably moved along with the turning of the turning member in comparison with the conventional technique described above, thereby enabling the reliable and stable choke operation via the choke rod. Moreover, the other end of the choke rod does not get caught in or does not scrape with the turning member, thereby reducing the decrease in durability of the components.

What is claimed is:
1. A working machine having an internal combustion engine provided as a power source and performing switch- ing among stop, drive, and choke operations of the internal combustion engine, the working machine comprising:

an operation lever turnable to a stop position in which the internal combustion engine is stopped, a drive position in which the internal combustion engine is made to be operational, and a choke position in which the choke operation is performed;

a turning member turnably combined with the operation lever;

a coupling biasing member that couples the operation lever to the turning member and imparts relative turning forces to both of the operation lever and the turning member; and a choke rod with one end coupled to a choke operating member that operates a choke valve and the other end coupled to the turning member, wherein the operation lever and the turning member are held in a state of abutting each other due to the turning forces imparted by the coupling biasing member, and the turning member is regulated in turning in a direction from the drive position to the stop position, wherein when the operation lever is turned from the drive position to the choke position, the turning member turns along with the operation lever to move the choke rod, and the movement of the choke rod causes the choke operating member to close the choke valve, whereas when the operation lever is turned from the drive position to the stop position, the operation lever moves against the turning force imparted by the coupling biasing member without turning the turning member.

2. The working machine according to claim 1, wherein turning of the turning member in the direction from the drive position to the stop position is regulated by the choke rod.

3. The working machine according to claim 1, wherein the operation lever is turnably supported by a given support shaft, and the turning member is turnably combined with the operation lever around the support shaft.

4. The working machine according to claim 3,
wherein the operation lever has a cylindrical shaft portion with a shaft insertion hole through which the support shaft is inserted,
wherein the turning member is turnably supported by the cylindrical shaft portion of the operation lever,
wherein the coupling biasing member is attached to the cylindrical shaft portion of the operation lever so as to couple the operation lever to the turning member and to impart relative turning forces to the operation lever and the turning member.

5. The working machine according to claim 4,
wherein the coupling biasing member is a torsion coil spring having a coil portion through which the cylindrical shaft portion of the operation lever can be inserted, a first hook portion extending from one end side of the coil portion, and a second hook portion extending from the other end side of the coil portion,
wherein the coil portion is attached to the cylindrical shaft portion of the operation lever, the first hook portion is hooked on the operation lever, and the second hook portion is hooked on the turning member.

6. The working machine according to claim 1, further comprising a throttle lever that is turned to adjust the flow rate of air-fuel mixture supplied to the internal combustion engine,
wherein the throttle lever in an initial position, in which the throttle lever is not turned yet, prevents turning of the operation lever from the drive position to the choke position, and allows the turning of the operation lever from the drive position to the choke position when the throttle lever has been turned from the initial position.

7. The working machine according to claim 1, wherein the operation lever returns to the drive position due to the turning force imparted by the coupling biasing member, when a turning operation force is removed in an intermediate position between the drive position and the stop position.

8. The working machine according to claim 1,
wherein the operation lever has a pressing section formed so as to press a switch terminal, formed of an elastic material, when the operation lever is in the stopped position,
wherein the pressing section presses the switch terminal to disable an ignition section of the internal combustion engine.

9. The working machine according to claim 8, wherein when the operation lever is turned from the drive position to the stop position, the pressing section presses the switch terminal even in a position before the stop position, to disable the ignition section of the internal combustion engine.

10. The working machine according to claim 8, wherein the switch terminal has a function as a turning stopper that inhibits the turning of the operation lever by engaging with the operation lever placed in the stop position.

11. The working machine according to claim 10, wherein the turning stopper formed by the switch terminal for the operation lever is released by turning the operation lever in the stop position by a given amount toward the drive position, and thereafter the operation lever turns up to the drive position due to the turning force imparted by the coupling biasing member.

* * * * *